US012621534B2

(12) United States Patent
Liu et al.

(10) Patent No.: US 12,621,534 B2
(45) Date of Patent: May 5, 2026

(54) PICTURE MODE REFRESHING METHOD AND DISPLAY APPARATUS

(71) Applicant: VIDAA (NETHERLANDS) INTERNATIONAL HOLDINGS B.V., Duiven (NL)

(72) Inventors: Qingna Liu, Qingdao (CN); Xing Wang, Qingdao (CN); Gang Lei, Qingdao (CN); Yuxiu Sun, Qingdao (CN); Wencai Sun, Qingdao (CN); Yunying Hao, Qingdao (CN); Qian Song, Qingdao (CN); Chunyu Li, Qingdao (CN); Peng Li, Qingdao (CN)

(73) Assignee: VIDAA (NETHERLANDS) INTERNATIONAL HOLDINGS B.V., Duiven (NL)

( * ) Notice: Subject to any disclaimer, the term of this patent is extended or adjusted under 35 U.S.C. 154(b) by 258 days.

(21) Appl. No.: 18/458,818

(22) Filed: Aug. 30, 2023

(65) Prior Publication Data
US 2023/0412890 A1 Dec. 21, 2023

Related U.S. Application Data

(63) Continuation of application No. PCT/EP2022/069163, filed on Jul. 8, 2022.

(30) Foreign Application Priority Data

Jul. 9, 2021 (CN) .......................... 202110778853.8
Jul. 14, 2021 (CN) .......................... 202110796909.2
(Continued)

(51) Int. Cl.
*H04N 21/485* (2011.01)
*H04N 21/442* (2011.01)

(52) U.S. Cl.
CPC ... *H04N 21/4854* (2013.01); *H04N 21/44204* (2013.01)

(58) Field of Classification Search
CPC ......... H04N 21/4854; H04N 21/44204; H04N 21/431; H04N 21/44008
See application file for complete search history.

(56) References Cited

U.S. PATENT DOCUMENTS 10,782,843 B2 * 9/2020 Singh ................. G06F 3/04847
2001/0043784 A1 11/2001 Shirata et al.
(Continued)

FOREIGN PATENT DOCUMENTS

CN 101354869 A 1/2009
CN 101556787 A 10/2009
(Continued)

OTHER PUBLICATIONS

First Chinese Office Action, mailed Dec. 20, 2023, from China Patent Application No. 202111051666.6.
(Continued)

*Primary Examiner* — Daniel W Parcher
(74) *Attorney, Agent, or Firm* — Workman Nydegger

(57) ABSTRACT

Provided are a refreshing method and a display apparatus. The method includes: presenting a video on a display of the display apparatus; detecting whether a content type of the video is switched from a first content type to a second content type; obtaining first picture quality parameter information matching the second content type from preset data of the display apparatus, wherein the preset data includes a predefined relation between a content type and picture quality parameter information, updating the parameter of the at least one picture quality setting option in the picture mode settings menu according to the first picture quality parameter information, and presenting the second section of the video
(Continued)

Picture mode settings menu · Source video (games)

according to the updated parameter of the at least one picture quality setting option in the picture mode settings menu.

18 Claims, 30 Drawing Sheets

(30) Foreign Application Priority Data

| | | |
|---|---|---|
| Aug. 20, 2021 | (CN) ......................... | 202110961753.9 |
| Sep. 8, 2021 | (CN) ......................... | 202111051666.6 |

(56) References Cited

U.S. PATENT DOCUMENTS

| | | | |
|---|---|---|---|
| 2005/0053159 A1 | 3/2005 | Sugimoto | |
| 2009/0073266 A1* | 3/2009 | Abdellaziz Trimeche ................. | H04N 1/00294 |
| | | | 348/180 |
| 2010/0178024 A1* | 7/2010 | Agarwal .............. | G11B 27/034 |
| | | | 386/278 |
| 2010/0281383 A1* | 11/2010 | Meaney ................. | G11B 27/34 |
| | | | 715/723 |
| 2012/0297422 A1 | 11/2012 | Mountain | |
| 2012/0314759 A1* | 12/2012 | Huang .............. | H04N 21/2343 |
| | | | 375/E7.126 |
| 2015/0039993 A1 | 2/2015 | Ishimaru et al. | |
| 2017/0061583 A1* | 3/2017 | Uratani ................. | G09G 5/395 |
| 2022/0030102 A1* | 1/2022 | Lee ........................ | G06N 20/00 |
| 2022/0083146 A1* | 3/2022 | Zhang ................ | H04N 21/4854 |

FOREIGN PATENT DOCUMENTS

| | | | |
|---|---|---|---|
| CN | 101827230 | A | 9/2010 |
| CN | 102123310 | A | 7/2011 |
| CN | 103546821 | A | 1/2014 |
| CN | 103747319 | A | 4/2014 |
| CN | 103956145 | A | 7/2014 |
| CN | 104469528 | A | 3/2015 |
| CN | 108966030 | A | 12/2018 |
| CN | 109151589 | A | 1/2019 |
| CN | 111405338 | A | 7/2020 |
| CN | 112214189 | A | 1/2021 |
| CN | 112887753 | A | 6/2021 |
| CN | 113014939 | A | 6/2021 |
| CN | 113038160 | A | 6/2021 |
| CN | 113163258 | A | 7/2021 |
| JP | 2006099803 | A | 4/2006 |
| WO | 2017193830 | | 11/2017 |

OTHER PUBLICATIONS

International Search Report and Written Opinion, European Int'l Search Authority, mailed Jan. 5, 2023, from PCT/EP2022/069163.

Chinese First Office Action, mailed Dec. 26, 2022, from Chinese Pat. App. No. 202110778853.8, 16 pages.

Chinese First Office Action, mailed Dec. 21, 2022, from Chinese Pat. App. No. 202110796909.2, 16 pages.

Chinese Second Office Action, mailed Apr. 8, 2023, from Chinese Pat. App. No. 202110796909.2, 15 pages.

* cited by examiner

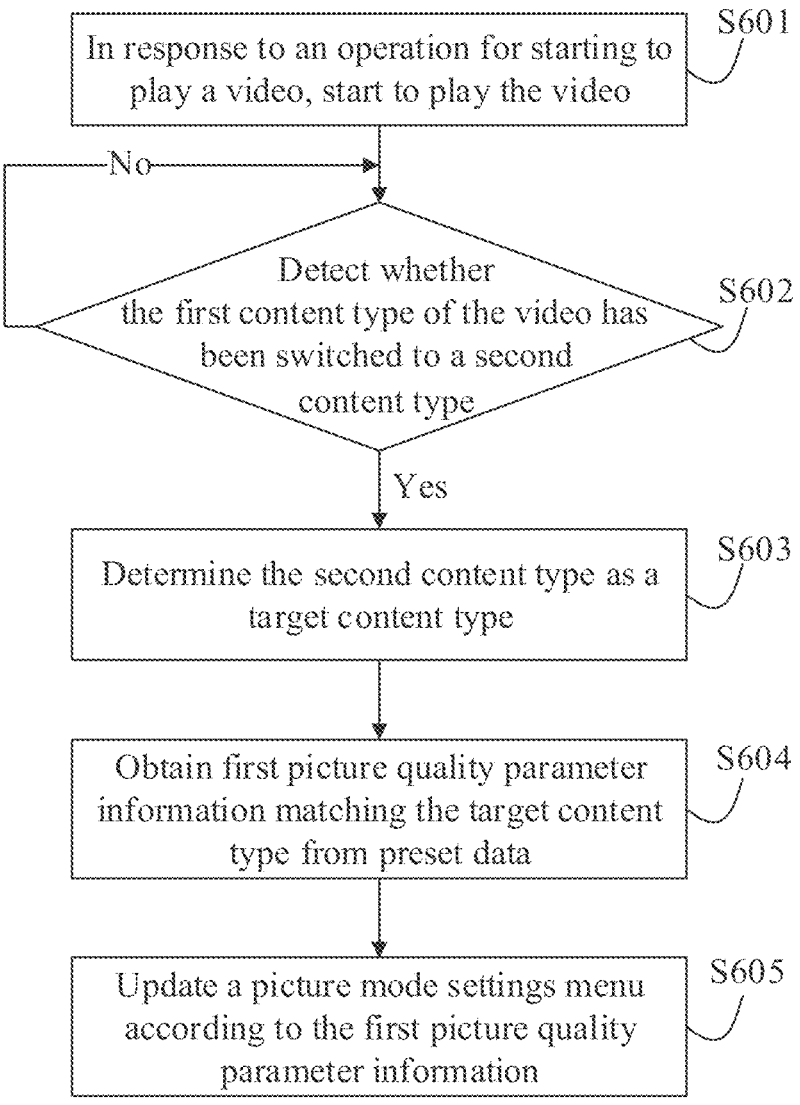

In response to an operation for starting to play a video, start to play the video — S601

No

Detect whether the first content type of the video has been switched to a second content type — S602

Yes

Determine the second content type as a target content type — S603

Obtain first picture quality parameter information matching the target content type from preset data — S604

Update a picture mode settings menu according to the first picture quality parameter information — S605

Fig. 6

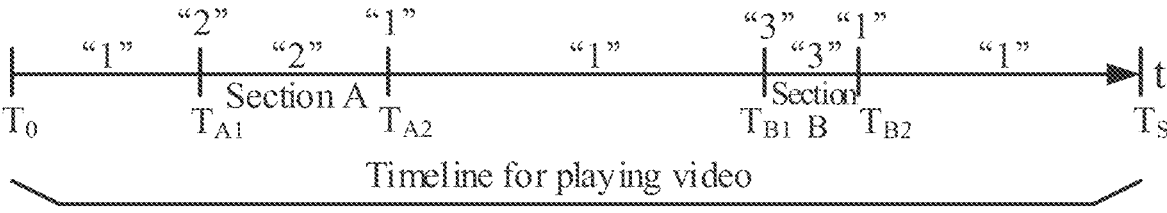

"2"        "1"                          "3"   "1"

"1"              "2"              "1"              "3"              "1"

$T_0$        $T_{A1}$  Section A  $T_{A2}$                          $T_{B1}$  Section B  $T_{B2}$                  $T_S$ Timeline for playing video

Fig. 7

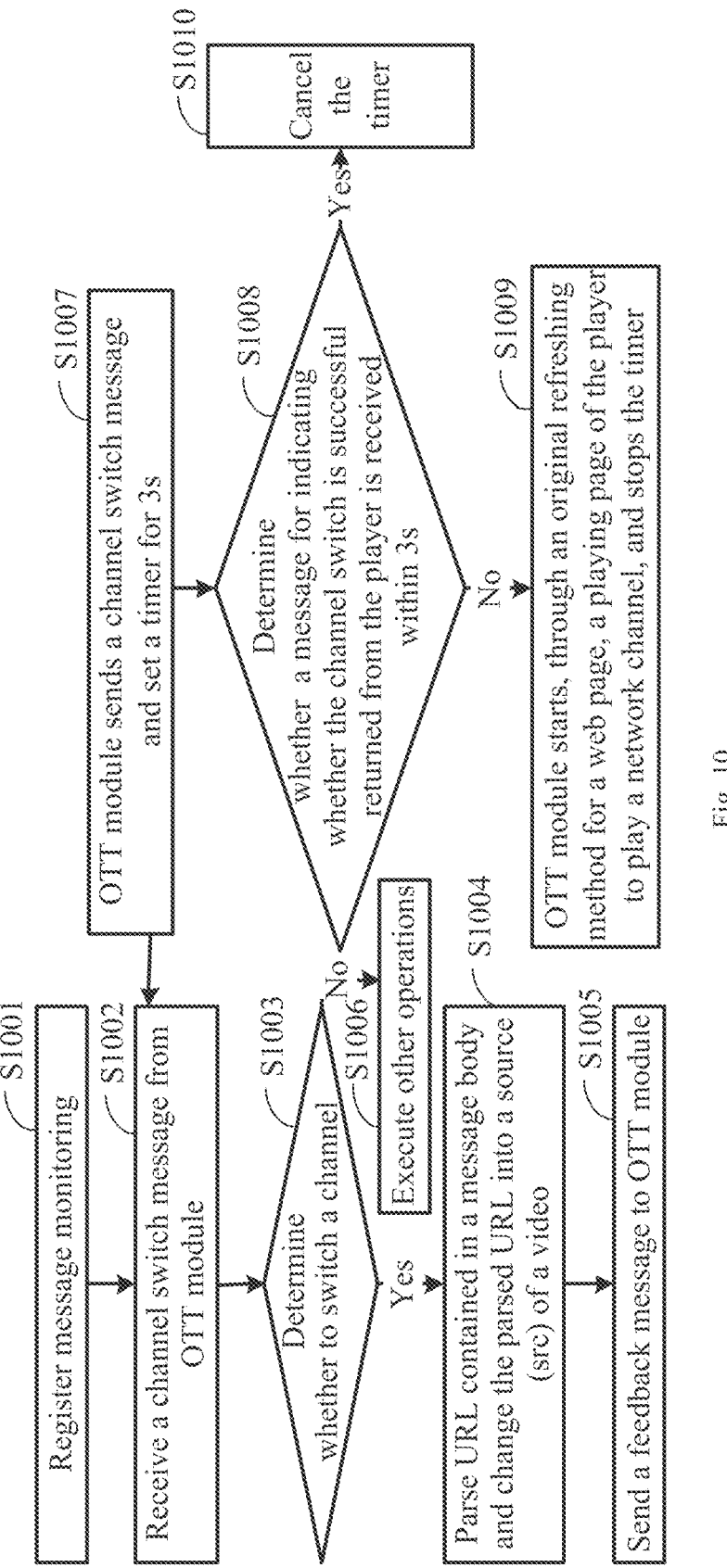

S1001 Register message monitoring

S1002 Receive a channel switch message from OTT module

S1003 Determine whether to switch a channel

S1006 Execute other operations

S1004 Parse URL contained in a message body and change the parsed URL into a source (src) of a video S1005 Send a feedback message to OTT module S1007 OTT module sends a channel switch message and set a timer for 3s S1008 Determine whether a message for indicating whether the channel switch is successful returned from the player is received within 3s S1010 Cancel the timer S1009 OTT module starts, through an original refreshing method for a web page, a playing page of the player to play a network channel, and stops the timer

Fig. 10

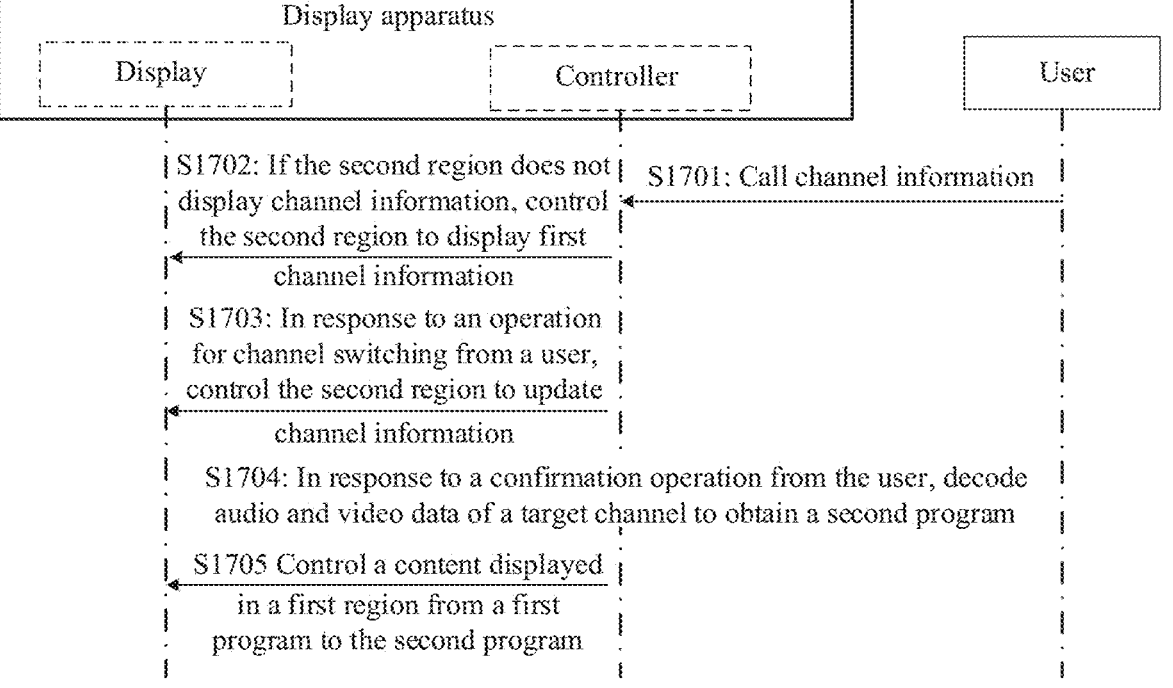

Display apparatus

Display

Controller

User

S1702: If the second region does not display channel information, control the second region to display first channel information S1701: Call channel information S1703: In response to an operation for channel switching from a user, control the second region to update channel information S1704: In response to a confirmation operation from the user, decode audio and video data of a target channel to obtain a second program S1705 Control a content displayed in a first region from a first program to the second program

Fig. 17

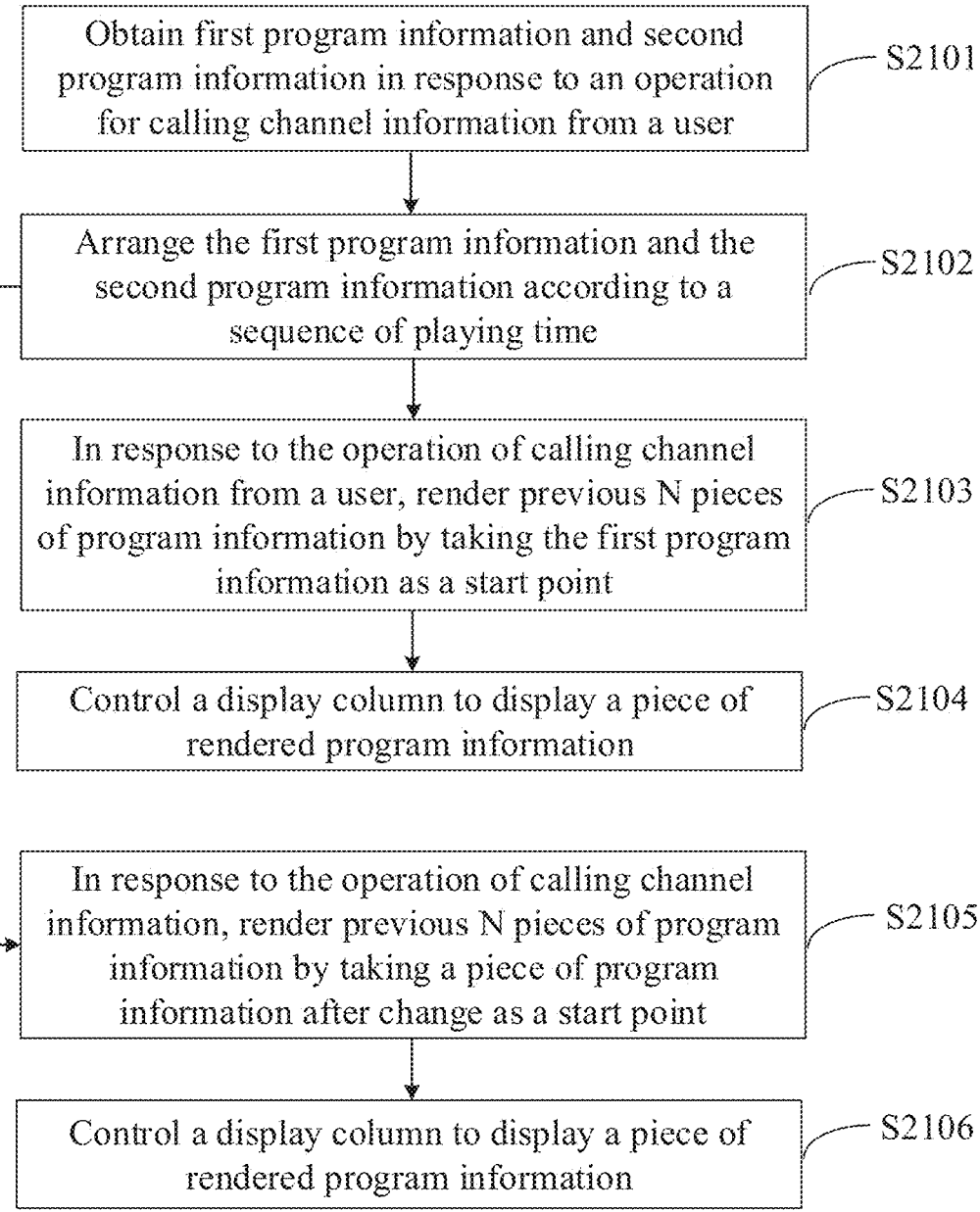

Obtain first program information and second program information in response to an operation for calling channel information from a user — S2101

Arrange the first program information and the second program information according to a sequence of playing time — S2102

In response to the operation of calling channel information from a user, render previous N pieces of program information by taking the first program information as a start point — S2103

Control a display column to display a piece of rendered program information — S2104

In response to the operation of calling channel information, render previous N pieces of program information by taking a piece of program information after change as a start point — S2105

Control a display column to display a piece of rendered program information — S2106

Fig. 21

| Program information 1 | Program information 2 | Program information 3 | Program information 4 |
|---|---|---|---|

Technical effects 2201

| Program information 2 | Program information 3 | Program information 4 | Program information 5 |
|---|---|---|---|

Technical effects 2202

Fig. 22

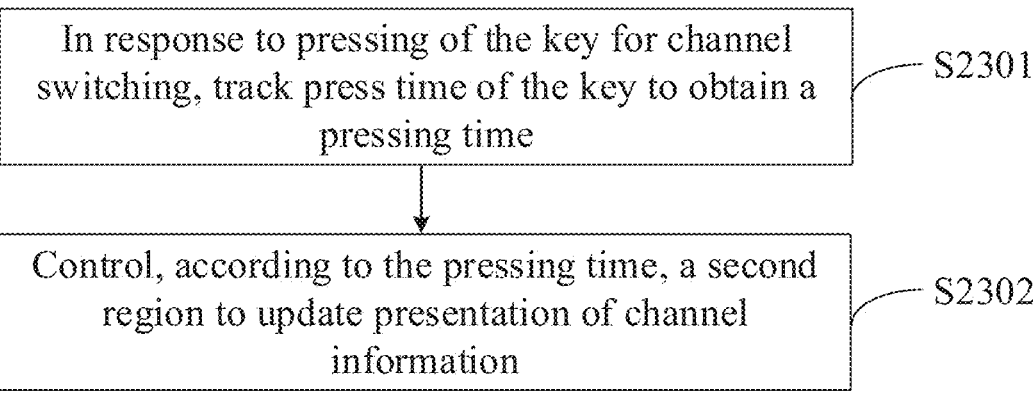

In response to pressing of the key for channel switching, track press time of the key to obtain a pressing time — S2301

Control, according to the pressing time, a second region to update presentation of channel information — S2302

Fig. 23

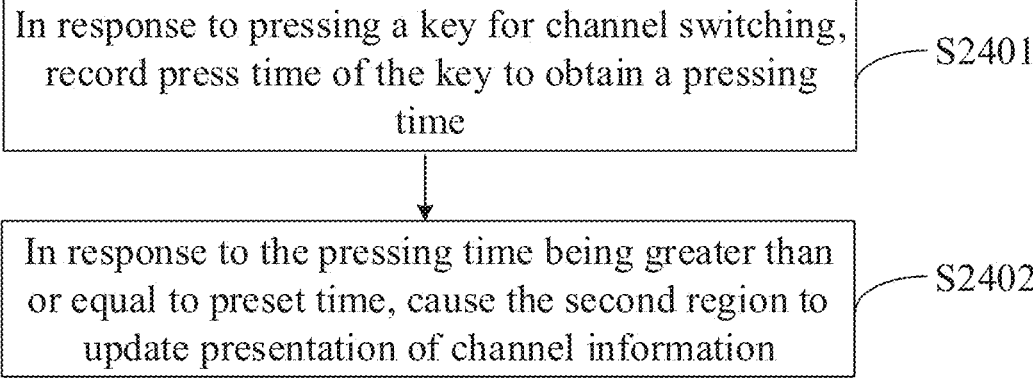

In response to pressing a key for channel switching, record press time of the key to obtain a pressing time — S2401

In response to the pressing time being greater than or equal to preset time, cause the second region to update presentation of channel information — S2402

Fig. 24

PICTURE MODE REFRESHING METHOD AND DISPLAY APPARATUS

CROSS REFERENCE TO RELATED APPLICATIONS

The present disclosure is a continuation application of International Application No. PCT/EP2022/069163 filed Jul. 8, 2022, which claims the benefit of priorities to Chinese Patent Application No. 202110778853.8, filed on Jul. 9, 2021, Chinese Patent Application No. 202110796909.2, filed on Jul. 14, 2021, Chinese Patent Application No. 202110961753.9, filed on Aug. 20, 2021, and Chinese Patent Application No. 202111051666.6, filed on Sep. 8, 2021, which are incorporated in the present disclosure in their entireties by reference.

FIELD

The present disclosure relates to display technology, and in particular to a refreshing method and a display apparatus.

BACKGROUND

A display apparatus supports Dolby Vision IQ in some scenarios. Dolby Vision IQ supports a High-Dynamic Range (HDR) picture adjustment function of original Dolby Vision, an adaptive picture quality adjustment function based on ambient brightness, etc., thus the display apparatus provides users with better viewing experience, with optimal picture quality in different scenes. Dolby Vision IQ further supports an Automatic Playback Oppimivation (APO) function. With this function, when watching a video, a user can synchronously view a picture mode settings menu where parameters of picture quality setting options matching a current video are displayed.

Each source video has a corresponding content type, for example, movie, game, sports etc. for indicating video theme or content characteristics. Videos with different content types have different picture quality parameters. Therefore, in a case that the content types of the videos are switched, related parameter settings in a picture mode settings menu should be updated accordingly. In the case where one source video has multiple content types, for example, when a clip A of a movie presents a game picture, that is, game contents are integrated into the movie, a user might view picture quality parameters of a previous content type after invoking a menu in a continuous playing process of such a special video, and real-time synchronization between a menu and a video content is still unavailable. In this case, the user needs to pause playing the video, and manually refresh the menu, for example, return to a previous menu first and then enter a next picture mode settings menu, so as to update parameters of picture quality settings in the picture mode settings menu, resulting in poor real-time synchronization between a menu and a video content, complicated operations and poor viewing experience.

SUMMARY

The present disclosure provides a display apparatus. The display apparatus includes a display configured to present a video, where the video is configured with a picture mode settings menu, and the picture mode settings menu includes at least one picture quality setting option and one of the at least one picture quality setting option includes a parameter; and a controller in connection with the display and configured to: present a video on the display, wherein the video has one or more content types, and the video comprises a first section with a first content type and a second section with a second content type; detect whether a content type of the video is switched from the first content type to the second content type; obtain first picture quality parameter information matching the second content type from preset data of the display apparatus, where the preset data includes a predefined relation between a content type and picture quality parameter information, and the first picture quality parameter information includes a parameter of at least one picture quality setting option corresponding to the second content type; and control the display to update the parameter of the at least one picture quality setting option in the picture mode settings menu according to the first picture quality parameter information and to present the second section of the video according to the updated parameter of the at least one picture quality setting option in the picture mode settings menu.

The present disclosure further provides a refreshing method for a display apparatus. The method includes: presenting a video on a display of the display apparatus, wherein the video has one or more content types, and the video includes a first section with a first content type and a second section with a second content type; detecting whether a content type of the video is switched from the first content type to the second content type; obtaining first picture quality parameter information matching the second content type from preset data of the display apparatus, the preset data including a predefined relation between a content type and picture quality parameter information, the first picture quality parameter information including a parameter of at least one picture quality setting option in a picture mode settings menu of the video corresponding to the second content type, and one of the at least one picture quality setting option includes a parameter; and updating the parameter of the at least one picture quality setting option in the picture mode settings menu according to the first picture quality parameter information, and presenting the second section the video according to the updated parameter of the at least one picture quality setting option in the picture mode settings menu.

BRIEF DESCRIPTION OF THE DRAWINGS

FIG. 6 is a flow diagram of a refreshing method for a menu according to some embodiments.

FIG. 7 is a schematic diagram of a playing timeline of a source video according to some embodiments.

FIG. 10 is a schematic diagram of a flow for processing data when a network channel is switched according to some embodiments.

FIG. 17 is a flow diagram of interaction between a display apparatus and a user according to some embodiments.

FIG. 21 is a flow diagram of a method for rendering a second region according to some embodiments.

FIG. 22 is a schematic diagram of a second region according to some embodiments.

FIG. 23 is a flow diagram of a method for rendering a second region according to some embodiments.

FIG. 24 is a flow diagram of a method for rendering a second region according to some embodiments.

DETAILED DESCRIPTION OF THE EMBODIMENTS

In order to make the objectives and implementations of the present disclosure clearer, the implementations of the present disclosure will be described clearly and completely with reference to the accompanying drawings in the embodiments of the present disclosure. Obviously, the embodiments described are some rather than all of the embodiments of the present disclosure.

It should be noted that the brief description of the terms in the present disclosure is for convenience of understanding the following implementations, and is not intended to limit the present disclosure. Unless otherwise noted, these terms should be understood according to their plain and ordinary meanings.

Figure 1:
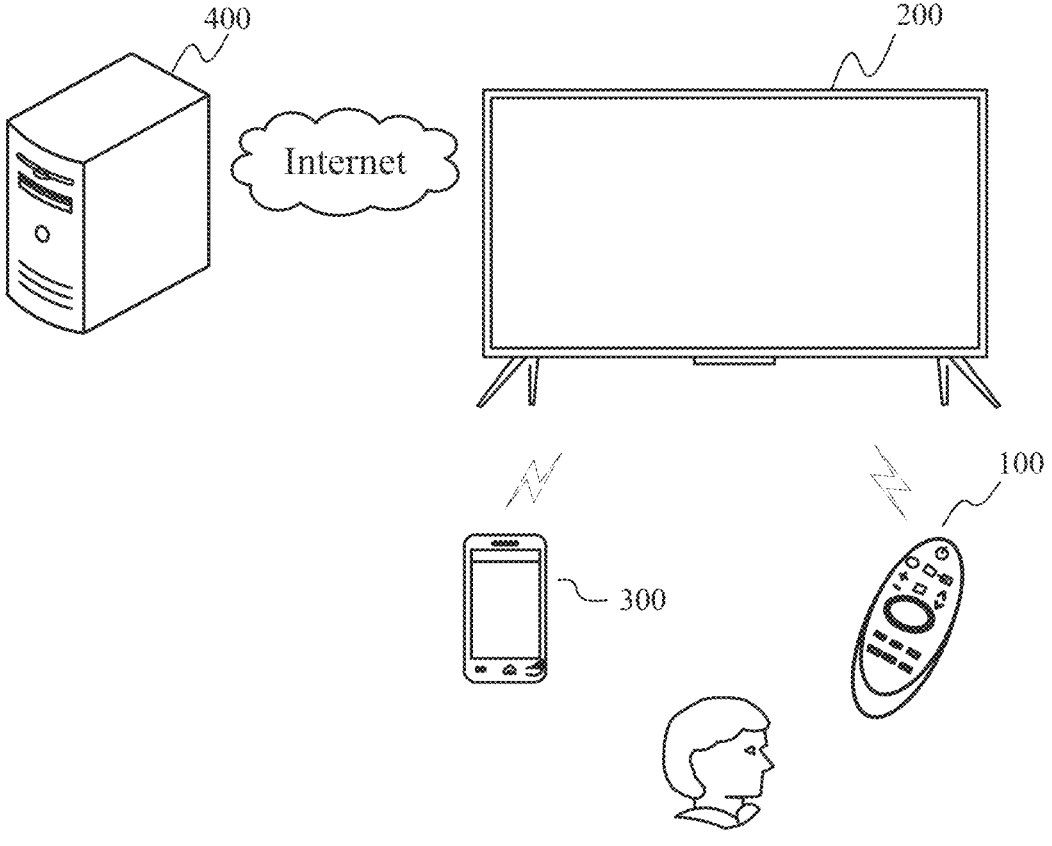
FIG. 1 is a schematic diagram of a scenario of a display apparatus according to some embodiments.

FIG. 1 shows a schematic diagram of a scenario of a display apparatus according to some embodiments of the present disclosure. As shown in FIG. 1, a display apparatus 200 is in data communication with a server 400. A user may operate the display apparatus 200 through a smart device 300 or a control device 100.

The control device 100 may be a remote control. Communications between the remote control and the display apparatus 200 include at least one of infrared protocol communication, Bluetooth protocol communication, or other short-distance communication manners. The control device 100 controls the display apparatus 200 in a wireless or wired manner. The user may control the display apparatus 200 by inputting a user command by adopting at least one of input methods such as key input on the remote control, voice input, and control panel input, etc.

The smart device 300 may include any one of a mobile terminal, a tablet computer, a computer, a notebook computer, an augmented reality (AR) device, a virtual reality (VR) device, or the like.

The user uses the smart device 300 to control the display apparatus 200. For example, the user uses an application running on the smart device 300 to control the display apparatus 200.

The smart device 300 is in data communication with the display apparatus.

The display apparatus 200 may be controlled by adopting a manner other than the control device 100 and the smart device 300. For example, a component for obtaining a voice command inside the display apparatus 200 directly receives voice command from a user, or a voice control device disposed outside the display apparatus 200 receives a voice command from the user.

The display apparatus 200 is in data communication with the server 400. The display apparatus 200 is in communication with the server 400 through a local area network (LAN), a wireless local area network (WLAN) or other networks. The server 400 may provide various contents and interactions for the display apparatus 200.

Figure 2:
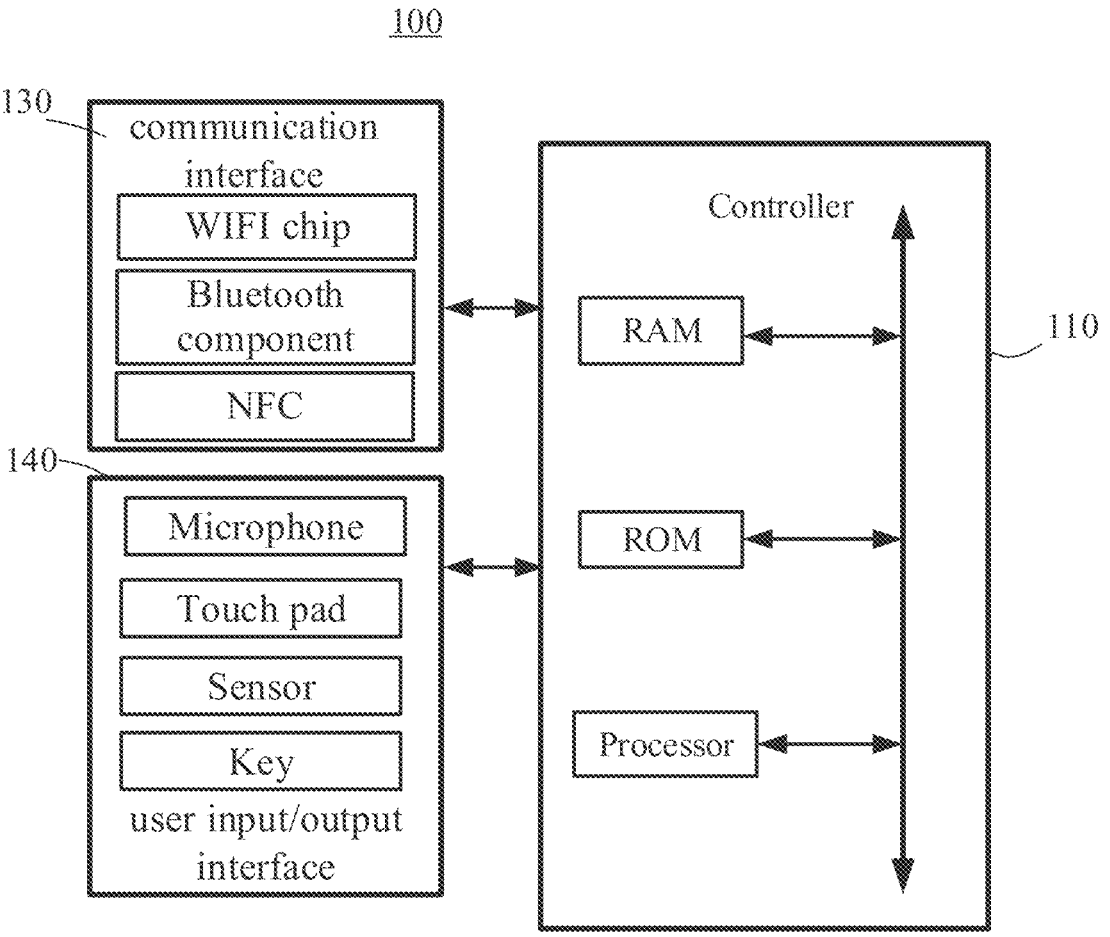
FIG. 2 is a block diagram of hardware configuration of a control device 100 according to some embodiments.

FIG. 2 shows a block diagram of hardware configuration of a control device 100 according to some embodiments of the present disclosure. As shown in FIG. 2, the control device 100 includes a controller 110, a communication interface 130, a user input/output interface 140, a memory (such as a random access memory (RAM) and a read-only memory (ROM)), a power supply (not shown in FIG. 2) and a processor.

The control device 100 receives an operation command input from the user, and converts the operation command into an instruction which can be identified and responded by the display apparatus 200. The control device 100 is configured to realize an interaction between the user and the display apparatus 200.

The communication interface 130 is configured to communicate with an external device. The communication interface 130 includes at least one of a WIFI chip, a Bluetooth component, a near field communication (NFC) component or an alternative component.

The user input/output interface 140 includes at least one of a microphone, a touch pad, a sensor, a key or an alternative component.

Figure 3:
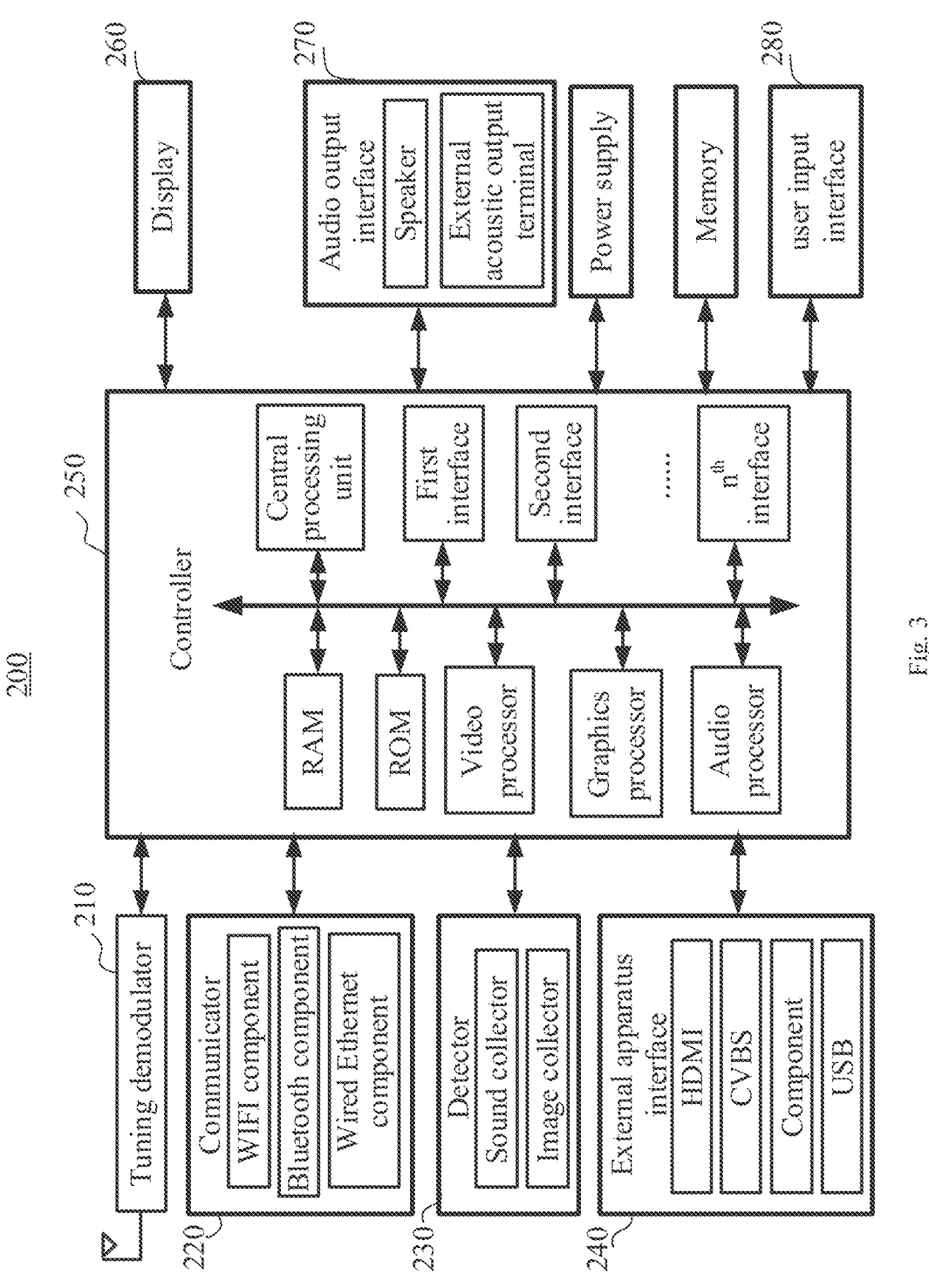
FIG. 3 is a block diagram of hardware configuration of a display apparatus 200 according to some embodiments.

FIG. 3 shows a block diagram of hardware configuration of a display apparatus 200 according to some embodiments of the present disclosure.

The display apparatus 200 includes at least one of a tuning demodulator 210, a communicator 220, a detector 230, an external apparatus interface 240, a controller 250, a display 260, an audio output interface 270, a memory, a power supply, or a user interface 280.

The controller 250 includes a central processing unit, a video processor, an audio processor, a graphics processor, an RAM, an ROM, and a first interface to an n$^{th}$ interface for user input/output, wherein n is an integer greater than or equal to 1.

The display 260 includes a display screen component configured to present a picture and a driving component for driving image display. The display 260 is configured to receive an image signal output from the controller 250, and present video content, image content, components of a menu manipulation interface, a user manipulation user interface (UI), and the like.

The display 260 may be at least one of a liquid crystal display, an organic light-emitting diode (OLED) display, or a projection display, and may also be a projection apparatus and a projection screen.

The tuning modulator 210 receives a broadcast television signal in a wired or wireless manner, and demodulates an audio and video signal, such as an electronic program guide (EPG) data signal, from a plurality of wireless or cable broadcast television signals.

The communicator 220 is configured to communicate with an external device or a server according to various communication protocols. For example, the communicator 220 may include at least one of a WiFi component, a Bluetooth component, a wired Ethernet component, and other network communication protocol chips or near field communication protocol chips, or an infrared receiver. The display apparatus 200 may send or receive a control signal and a data signal to the control device 100 or the server 400 through the communicator 220.

The detector 230 is configured to collect a signal from an external environment or a signal interacting with the outside. For example, the detector 230 includes an optical receiver and a sensor configured to collect an ambient light intensity; or the detector 230 includes an image collector, such as a camera, which may be configured to collect an external environment scenario, user attributes or user interaction gesture; or the detector 230 includes a sound collector, such as a microphone, for receiving external sound.

The external apparatus interface 240 may include but is not limited to the following interfaces: any one or a plurality of a high definition multimedia interface (HDMI), an analog or data high-definition component input interface (component), a composite video input interface (a composite video broadcast signal (CVBS)), a universal serial bus (USB) input Interface (USB), or an RGB interface.

The controller 250 and the tuning modulator 210 may be located in individual devices. That is, the tuning modulator 210 may also be in an external device of a main body device where the controller 250 is located, such as an external set top box.

The controller 250 controls work of the display apparatus and responds to operations of the user through various software control programs stored on the memory. The controller 250 controls an overall operation of the display apparatus 200. For example, in response to a user command for selecting a UI object to display on the display 260, the controller 250 may execute an operation relevant to the object selected by the user command.

The controller 250 includes at least one of a central processing unit (CPU), a video processor, an audio processor, a graphics processor (GPU), an RAM, an ROM, a first interface to an nth interface for inputting/outputting, a communication bus or the like.

The graphics processor is configured to generate various graphic objects, such as at least one of an icon, an operation menu, a display graphic of a command input from a user or the like. The graphics processor includes an arithmetic unit, which performs computation by receiving various interaction commands input from the user and displays various objects according to a display attribute. The graphics processor further includes a renderer, for rendering various objects obtained based on the arithmetic unit. The above rendered objects are presented on the display.

The video processor is configured to receive an external video signal, and then perform video processing on the received external video signal according to a standard codec protocol of an input signal to obtain a signal that can be directly displayed or played on the display apparatus 200.

The audio processor is configured to receive an external audio signal and perform at least one of decompression, decoding, noise reduction, digital-to-analog conversion or amplifying processing on the audio signal according to a standard encoding and decoding protocol of the input audio signal to obtain a sound signal which can be played in a speaker.

The user may input a command on a graphical user interface (GUI) displayed on the display 260, and then the user input interface receives the command input from the user through the graphical user interface (GUI). Alternatively, the user may input the command by inputting a specific sound or gesture, and then the user input interface identifies the sound or gesture through a sensor so as to receive the command input from the user.

In some embodiments, the user input interface 280 is an interface (such as a physical key on a display apparatus body) configured to receive control input.

Figure 4:
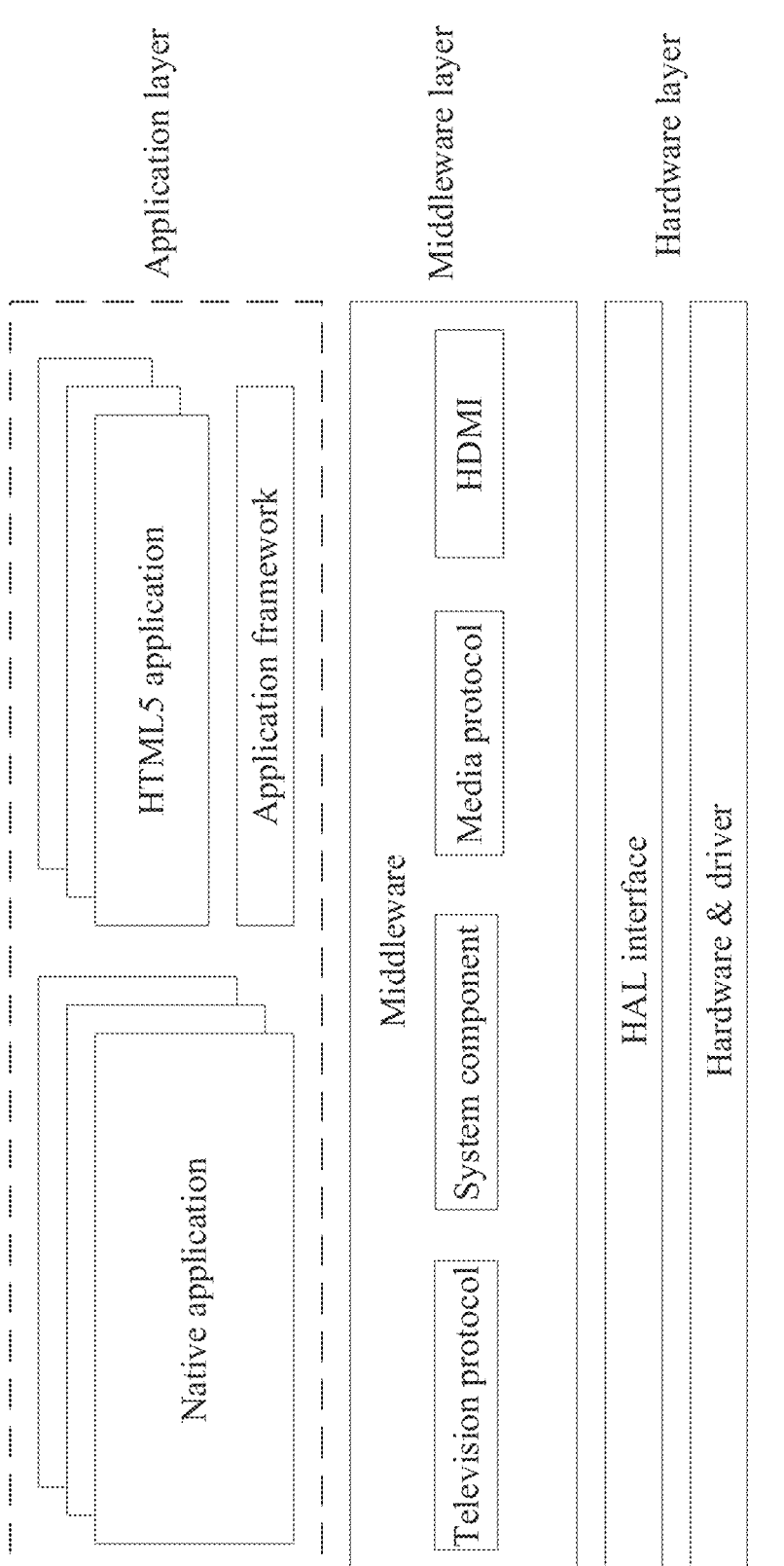
FIG. 4 is a diagram of software configuration in a display apparatus 200 according to some embodiments.

As shown in FIG. 4, a system of the display apparatus includes three layers: an application layer, a middleware layer and a hardware layer from top to bottom respectively.

The application layer mainly includes common applications on television and an application framework. The common applications are mainly applications developed based on a browser, such as HTML5 Applications (Apps) and native applications (native APPs).

The application framework is a program model, and has all basic functions required by standard application software, such as file access and data exchange. The application framework further includes use interfaces (such as a toolbar, status bar, a menu and a dialog box) of these functions. The native applications may support online or offline work, and message push or local resource access.

The middleware layer includes middleware such as various television protocols, multimedia protocols and system components. The middleware may use a basic service or function provided by the system software, to link applications of various parts of an application system on a network or different applications, and can achieve resource sharing and function sharing.

The hardware layer mainly includes a hardware abstraction layer (HAL) interface, hardware and a driver, wherein the HAL interface is a uniform interface in connection with all television chips, and specific logic is implemented by all the chips. The drive mainly includes: an audio driver, a display driver, a Bluetooth driver, a camera driver, a WIFI driver, a USB driver, an HDMI driver, a sensor driver, a power driver and the like. For example, the sensor driver may be a fingerprint sensor, a temperature sensor, a pressure sensor and the like.

In some embodiments, the display apparatus supports Dolby Vision IQ and an automatic playback oppimivation (APO) function configured in Dolby Vision IQ. The APO function allows a user to view a picture mode settings menu while watching a source video.

In some embodiments, a playing interface of an APO video is provided with a menu control. A user clicks the menu control to invoke and hide the picture mode settings menu. The controller invokes the picture mode settings menu in response to a selection of the menu control from the user, and displays the picture mode settings menu on the playing interface. The user clicks the menu control again to hide the picture mode settings menu. In some embodiments, the user may transmit the APO video into the display apparatus by means of a removable storage device such as a USB flash disk or a hard disk. In some embodiments, the user may watch, by means of an application supporting Dolby Vision IQ, an online APO video or an APO video downloaded, as long as the picture mode settings menu may be invoked and displayed synchronously while the video is playing.

Figure 5:
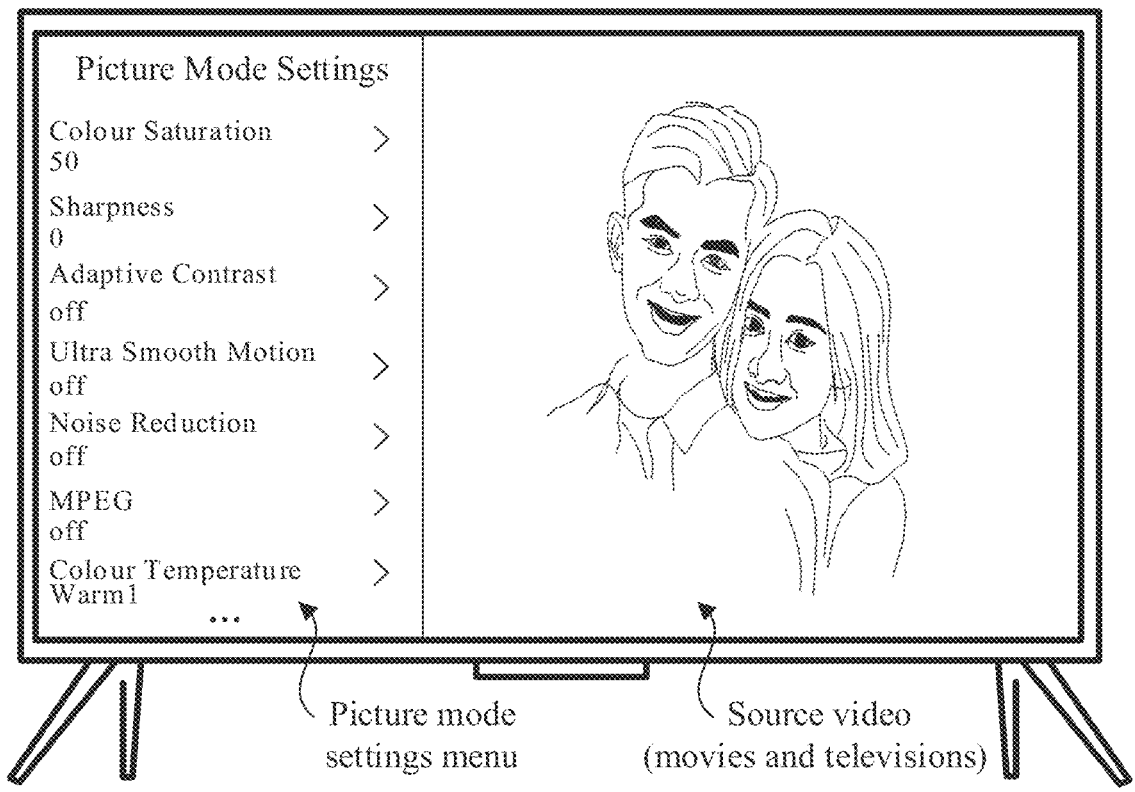
FIG. 5(A) is a schematic diagram of a user interface (UI) presenting a picture mode settings menu in the case of one content type according to some embodiments.
FIG. 5(B) is a schematic diagram of a UI presenting a picture mode settings menu in the case of another content type according to some embodiments.
Figure 5:
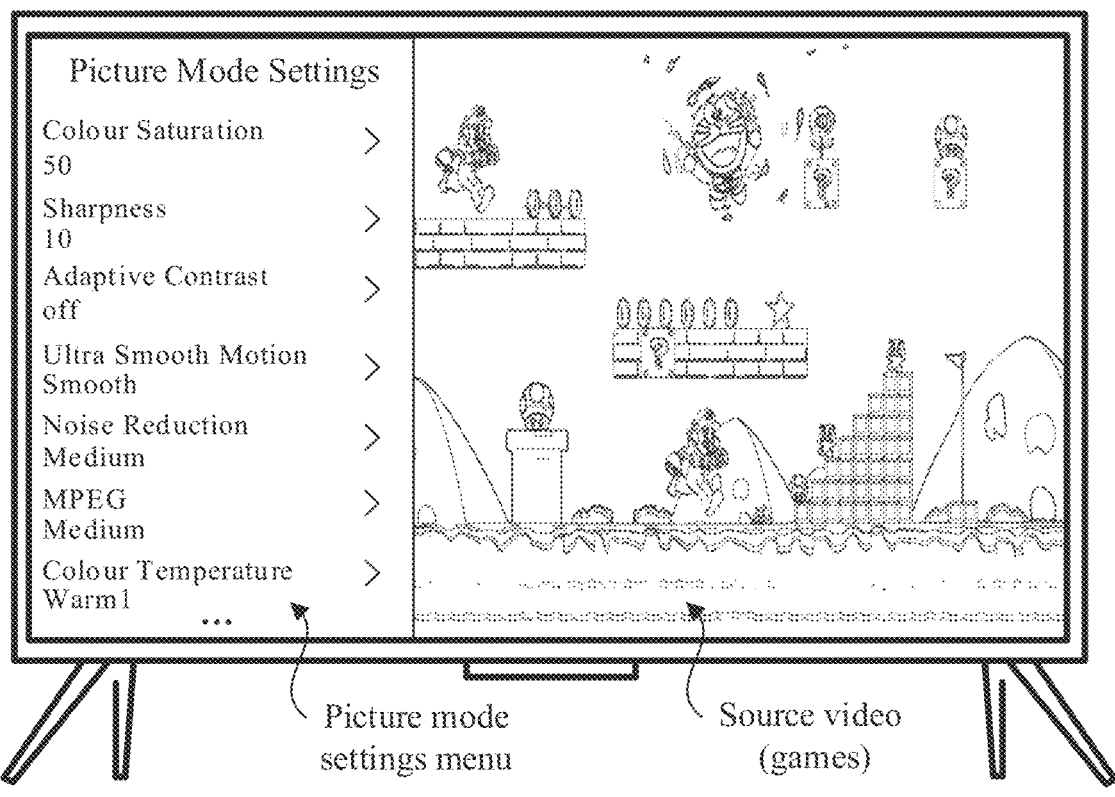

In some embodiments, invoking or hiding the picture mode settings menu may be triggered by other manners. For example, the user issues a menu invoking command or a menu hiding command by a specific gesture command, a voice command, or an operation command input via a remote control or a touch screen. FIG. 5(A) and FIG. 5(B) are schematic diagrams of a user interface (UI) presenting picture mode settings menus for different content types according to some embodiments.

After the picture mode settings menu is invoked, the picture mode settings menu may be displayed at a predetermined position of a layer above the layer where the video playing interface locates, as shown in FIG. 5(A), the picture mode settings menu is displayed in a local area at a left side of a picture.

In some embodiments, the picture mode settings menu includes at least one picture quality setting option, such as colour saturation, sharpness, adaptive contrast, ultra smooth motion, noise reduction, moving picture experts group (MPEG), colour temperature, motion compensation (MEMC), etc.

In some embodiments, each picture quality setting option in the picture mode settings menu has an adjustable parameter. For example, parameters of the MPEG option include off, low, medium, and high. When the parameter is set as off, an MPEG picture quality optimization function is not started or off; and when the parameter is set as low, medium, or high, it is indicated that the MPEG picture quality optimization function is started, but optimization degrees are different. Since different content types have different requirements for video quality, when a content type of a video is switched, the parameters of some or all of the picture quality setting options in the picture mode settings menu will change, and it is necessary to update the menu synchronously when the content type is switched. For example, in FIG. 5(A), a movie type video is played, in FIG. 5(B), a game type video is played, and parameters of options such as sharpness, ultra smooth motion, noise reduction, and MPEG in the picture mode settings menu shown in FIG. 5(A) are different from those in the picture mode settings menu shown in FIG. 5(B).

Now for most display apparatuses, before presenting picture mode settings menus, UI layers send requests to a middleware layer initiatively to obtain parameters of picture quality setting options in the picture mode settings menus. The UI layer may send requests to the middleware layer to obtain picture quality parameters, for example, by returning to a previous menu (such as a home page menu) first, and then entering a secondary picture mode settings menu, so as to cause a menu refreshing operation. The UI layer requests the middleware layer to obtain parameters of picture quality setting options corresponding to current content types, and refresh the picture mode settings menus after receiving the parameters, so as to display new parameters of the refreshed picture mode settings menus. That is, current menu refreshing mainly depends on active behaviour from a user, and the display apparatus may not refresh the menu in real time on its own.

A plurality of content types may be integrated in the same source. For example, in a Movie1, a clip A presents a game picture which belongs to game type, and a clip B presents a sports picture which belongs to sports type, that is, three content types are integrated in one source, and are marked as a content type 1 (referring to a movie type), a content type 2 (referring to a game type) and a content type 3 (referring to a sports type) respectively. For such a special source video, before the clip A is displayed, a picture mode settings menu invoked by a user is version E1, and E1 matches the content type 1. When the clip A of the Movie1 is played, the content type is switched from the content type 1 to the content type 2. If the user does not manually refresh the menu, the UI layer will present a picture mode settings menu of version E1 while playing clip A, which obviously leads to menu update lag and poor real-time synchronization between playing content and picture mode settings. In addition, when a video is played, the content types may continuously jump, such that after a user refreshes a menu a little while, a video content of a next type will be played, which still causes non-synchronization between the playing content and picture mode settings. Therefore, a user often needs to pause the video first, and then manually refresh a menu.

In view of the above issues with the APO function, an embodiment of the present disclosure provides a refreshing method for a menu, which may be run the controller 250 of the display apparatus. As shown in FIG. 6, the refreshing method for a menu includes S601-S605.

S601: in response to an operation for starting to play a video, start to play the video, where the video has two or more content types and the video is started with a first content type.

S602: detect whether the first content type of the video has been switched to a second content type, in response to the first content type having been switched to the second content type, the flow goes to S603, in response to the first content type having not been switched to the second content type, the flow goes to S602.

S603: determine the second content type as a target content type.

The video may be a video from a video provider or a video application platform, such as streaming applications, or the video may be a source from a data management platform (DMP) channel, or the video may be a source from a physical channel such as a high definition multimedia interface (HDMI). Streaming applications may serve as a signal source for a virtual channel of a display apparatus, may be referred to as a virtual channel or a network channel, and is different from a physical channel (or interface) such as a digital visual interface (DVI), a television (TV), an AV, an HDMI, a video graphics array (VGA), and a component connector. For the display apparatus in an embodiment of the present disclosure, a virtual channel and a channel corresponding to a physical interface may be taken together as a mixed channel that may be selected by a user. The user may change between a virtual channel and a channel corresponding to the physical interface by means of a remote control or a voice command, and a change method will be described in detail below.

A video configuration file may be configured for each source video. The video configuration file records a corresponding relation between a switch node marked on a playing timeline and a target content type. The corresponding relation indicates the controller 250 to switch to a content type when a switch node is reached. Therefore, when loading the source video, the display apparatus loads inherent video data of the source video and obtains a video configuration file, and monitors a playing process of the video in real time. When a switch node indicated by the video configuration file is reached in the playing process, the display apparatus obtains a target content type corresponding to the switch node.

In some embodiments, for example, a source video being played is Movie1 with one hour duration. A section A is played at a tenth minute of the Movie1, the section A presents a game playing picture, and the timeduration for the section A is 10 minutes. A section B is played at a fortieth minute of the Movie1, the section B presents a sports playing picture, and the time duration for the section B is 5 minutes. A content type of a main content of the Movie1 is set as a first content type identifier (refers to a movie type), a content type of the section A is set as a second content type identifier (refers to a game type), and a content type of the section B is set as a third content type identifier (refers to a sports type), then a playing timeline shown in FIG. 7 may be constructed.

In some embodiments, as shown in FIG. 7, total time of the playing timeline is 60 minutes. A switch node TA1 is marked at a one-sixth position of the playing timeline, a target content type corresponding to the switch node TA1 is the second content type identifier, a switch node TA2 is marked at a one-third position of the playing timeline, and a target content type corresponding to the switch node TA2 is the first content type identifier, that is, TA1 and TA2 are a start point and an end point of the section A respectively. A switch node TB1 is marked at a two-thirds position of the playing timeline, a target content type corresponding to the switch node TB1 is the third content type identifier, a switch node TB2 is marked at a three-quarters position of the playing timeline, and a target content type corresponding to the switch node TB2 is the first content type identifier, that is, TB1 and TB2 are a start point and an end point of the section B, respectively.

When contents between the start point TO and the switch node TA1 of the video are playing in the playing process, the content type remains as the first content type identifier. When the switch node TA1 is reached in the playing process, that is, first time for changing the content type/updating the menu is detected, the obtained target content type is the second content type identifier, that is, the content type is switched from the first content type identifier to the second content type identifier. When contents between TA1 and TA2 are playing in the playing process, the content type remains as the second content type identifier. When the switch node TA2 is reached in the playing process, that is, second time for changing the content type/updating the menu is detected, the obtained target content type is the first content type identifier, that is, the content type is switched from the second content type identifier to the first content type identifier.

When contents between TA2 and TB1 are playing in the playing process, the content type remains as the first content type identifier. When the switch node TB1 is reached in the playing process, that is, third time for changing the content type/updating the menu is detected, the obtained target content type is the third content type identifier, that is, the content type is switched from the first content type identifier to the third content type identifier. When contents between TB1 and TB2 are playing in the playing process, the content type remains as the third content type identifier. When the switch node TB2 is reached in the playing process, that is, fourth time for changing the content type/updating the menu is detected, the obtained target content type is the first content type identifier, that is, the content type is switched from the third content type identifier to the first content type identifier. When contents between the switch node TB2 and an end point TS of video playing are presenting in the playing process, the content type remains as the first content type identifier. Based on an indication of the video configuration file, the controller may obtain a content type at any time node in the whole process of video playing, and accurately time point for changing the content type/updating the menu. Therefore, real-time, synchronous and automatic update of the menu may be achieved according to a change of the content type without pausing playing a video in the whole process, thereby improving real-time picture quality adjusting experience, automatically adjusting the picture mode settings menu.

In some embodiments, in S603, video frames at switch nodes may be marked by dotting without configuring video configuration files additionally. For example, according to the above embodiments, a start frame of the section A is marked as (TA1, "the second content type identifier") by dotting, an end frame of the section A is marked as (TA2, "the first content type identifier") by dotting, a start frame of the section B is marked as (TB1, "the third content type identifier") by dotting, and an end frame of the section B is marked as (TB2, "the first content type identifier") by dotting, that is, dotting information of each of the four frames includes a first identifier (such as, TA1, TA2, TB1, and TB2) for identifying the frame as a switch node, and a second identifier (such as, "the first content type identifier", "the second content type identifier" and "the third content type identifier") for identifying the target content type. For example, for the dotting information at the start frame of the section A, the dotting information includes TA1 (for example, the first identifier may be marked as switch) and the second content type identifier (the second identifier). In a continuous display process of the video frames, the frame in which the content type is switched may be known by detecting and identifying the dotting information.

In some embodiments, when an $i^{th}$ frame of a video is played, whether a preset number of continuous M frames (i.e., $(i+1)^{th}$ frame to $(i+M)^{th}$ frame) after the $i^{th}$ frame have dotting information is detected. If the dotting information is detected, a target frame where a switch node is located may be obtained in advance according to the detected dotting information, and first picture quality parameter information matching the target content type at the target frame may be obtained in advance, and a menu is synchronously updated by means of the first picture quality parameter information when a target frame of the video is played. In this way, the problem that when the target frame of the video where the switch node is located is played, menu update lag is caused due to time consumption generated by obtaining the target content type, matching the first picture quality parameter information and refreshing the menu on the UI may be avoided, and real-time synchronous update of the menu along with a change of the content type is ensured. The preset number M is an integer greater than or equal to 1, and may be set according to time consumption generated by the target content type, matching the first picture quality parameter information and refreshing the menu on the UI and in combination with a frame rate and other related information.

In some embodiments, in the S603, the video configuration file may not be required to be set or the video may not be required to be subjected to the above dotting marking. For example, the display apparatus identifies a content type and a switch node of a video according to factors such as picture features and similarity differences of video frames, and then autonomously decides whether to update the picture quality setting menu.

S604, obtain first picture quality parameter information matching the target content type from preset data.

In some embodiments, the preset data includes a predefined corresponding relation between a content type and picture quality parameter information. The picture quality parameter information includes a parameter of at least one picture quality setting option in the picture mode settings menu. The preset data may be stored in a memory of the controller or a designated database in different forms such as a list, a set, etc. The preset data may be updated, for example, a corresponding relation item is added into the preset data, an existing corresponding relation item from the preset data is deleted or modified, etc. The controller supports to configure, manage and maintain the preset data.

In some embodiments, the picture quality setting options in the picture mode settings menu may be pre-filtered, for example, picture quality setting options that are prone to change along with changes of content types are filtered out, and the picture quality setting options with default parameters or with parameters that are adaptively adjusted are filtered out, so as to obtain a set of options. For example, the set of options includes sharpness, noise reduction, and MPEG. The controller may configure optimal parameters for the picture quality setting options included in the set of options respectively for different content types, so as to construct picture quality parameter information corresponding to different content types.

In some embodiments, the content type may be defined and identified by an identifier, such as "movie type", "game type," "sports type", and "user-defined content type". The preset data may be traversed by means of the identifier of the target content type, and the picture quality parameter information corresponding to the target content type is matched from the preset data. For convenience of distinction, the picture quality parameter information corresponding to the target content type is named as the first picture quality parameter information in the present disclosure.

S605, update the picture mode settings menu according to the first picture quality parameter information.

In some embodiments, the first picture quality parameter information includes parameters of picture quality setting options corresponding to the target content type, and the UI layer obtains the first picture quality parameter information, that is, the parameters of the corresponding picture quality setting options in the picture mode settings menu may be updated according to indicated parameters, so as to achieve real-time, synchronous and automatic refreshing of the menu along with a change of the content type.

In some embodiments, when the video starts to be played, the picture mode settings menu may be synchronously displayed by default, or the picture mode settings menu may be displayed after a user inputs a command for invoking a menu, and the user may view a real-time dynamic state that the parameters of the picture quality setting options are updated along with a change of a video content in real time by means of a menu page. During this time, the video is not required to be paused, and the user needs not to manually refresh the menu. Even if the content type of the video is switched, the picture mode settings menu is also in a hidden state. After a user inputs a command for invoking a menu, picture quality parameters corresponding to a current updated content type may still be displayed in a displayed menu, such that synchronization and consistency between menu parameters and display of the video content are ensured.

Since the preset data may not define a target content type and corresponding picture quality parameter information, the controller 250 may not match the target content type from the preset data, resulting in failure of real-time synchronous refreshing of the picture mode settings menu. In some embodiments, a default content type may be set in the preset data, and for the convenience of distinction, picture quality parameter information corresponding to the default content type is referred to as second picture quality parameter information. If no first picture quality parameter information matching the target content type is obtained from the preset data, the second picture quality parameter information is invoked from the preset data, and the picture mode settings menu is updated according to the second picture quality parameter information. For the content type not defined in the preset data, the controller may uniformly invoke general second picture quality parameter information to update the menu, that is, an unknown content type is mapped as a default content type.

In some embodiments, the preset data further includes several reserved data bits, and the controller 250 may define a newly added content type according to actual use requirements, configure corresponding picture quality parameter information for the newly added content type, and then store a corresponding relation between the newly added content type and the picture quality parameter information thereof in the reserved data bits. This embodiment supports to define the newly added content type and the corresponding picture quality parameter information thereof, so as to extend the preset data and improve a capability of adapting to more content types.

In some embodiments, content types are divided into sixteen types in the preset data, which are respectively identified as 0-15, where the identifiers 0-6 indicates defined content types, and the identifiers 7-15 indicates reserved to-be-defined types. The controller may define a content type indicated by any one of the identifiers 7-15 and corresponding picture quality parameter information thereof.

Figure 8:
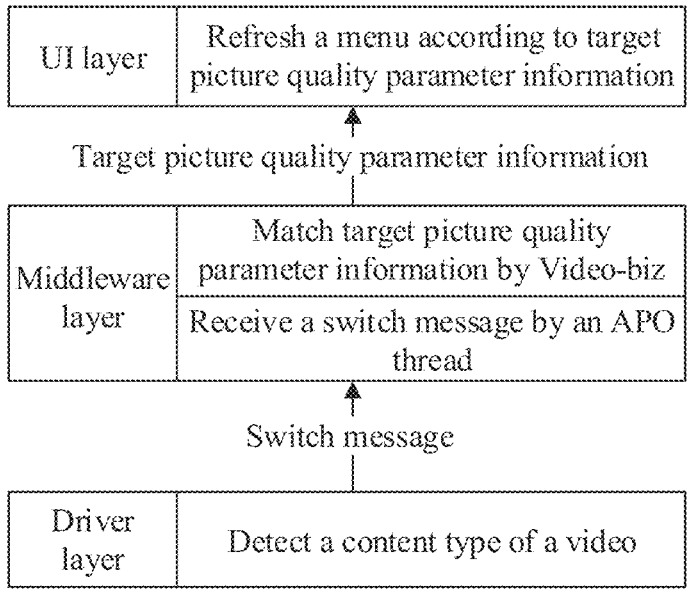
FIG. 8 is a logical architecture diagram of a refreshing method for a menu according to some embodiments.

FIG. 8 provides a logical architecture of a refreshing method for a menu. The logical architecture includes a driver layer, a middleware layer, and a UI layer. The driver layer, the middleware layer and the UI layer works together and are controlled by the controller. In some embodiments, the driver layer detects whether a content type of a video is switched, if the content type of the video being played on the display is switched, the driver layer generates a change message according to a target content type after change, and sends the change message to the middleware layer.

In some embodiments, the middleware layer may establish an APO thread. The APO thread is used for receiving the change message sent from the driver layer. After the middleware layer receives the change message through the APO thread, according to the target content type indicated by the change message, video-biz in the middleware layer is controlled to match the picture quality parameter information corresponding to the target content type from the preset data. If the video-biz obtains first picture quality parameter information matching the target content type, the video-biz sends the first picture quality parameter information to the UI layer. If the Video-biz may not match the first picture quality parameter information corresponding to the target content type from the preset data, the Video-biz sends second picture quality parameter information corresponding to a default content type to the UI layer. As one of processing links in the middleware layer, the video-biz is linked between the middleware layer and the UI layer to receive the target content type sent from the middleware layer, match the target picture quality parameter information (such as the first picture quality parameter information or the second picture quality parameter information), and send the target picture quality parameter information to the UI layer.

In some embodiments, the UI layer may register a listener, and communication between the UI layer and the middleware layer (that is, the video-biz) is achieved by means of call and callback of the listener. After receiving the target picture quality parameter information from the video-biz, the UI layer updates corresponding parameters in a picture mode settings menu according to parameters of picture quality setting options indicated by the target picture quality parameter information, so as to refresh the menu.

A smart television is connected with a television network by means of a set top box, so as to watch digital television (DTV) channels. The smart television is connected with the internet by means of an over the top (OTT) device, so as to watch network channels (OTT channels). Commonly used OTT devices include streaming media boxes, television sticks, smart TVs, etc. DTV channels and OTT channels may be combined in a channel list.

In some embodiments, the smart television obtains video resources of the network channels, calls a channel switch interface in application manager to start a browser for playing the network channel, refreshes a playing page for presenting a player after the browser is started, and plays video resources corresponding to the network channels in the playing page, so as to switch a network channel.

However, when the smart television switches to a network channel, the smart television is required to wait for loading the browser playing a current network channel, wait for refreshing the playing page for presenting the player on a loaded browser page, and wait for rendering the video resources from the network channel on the playing page, and until the cu network channel is played, the smart television may continue to switch the network channel to a next channel.

In view of slow browser loading, repeatedly refreshing of playing page on the browser and long response time during network channel switching, an embodiment of the present disclosure provides a display apparatus and a method for quickly changing and presenting a network channel.

The embodiments of the present disclosure may be applied to various types of display apparatuses including, but not limited to: a smart television, liquid-crystal display television and other display apparatuses.

Figure 9A:
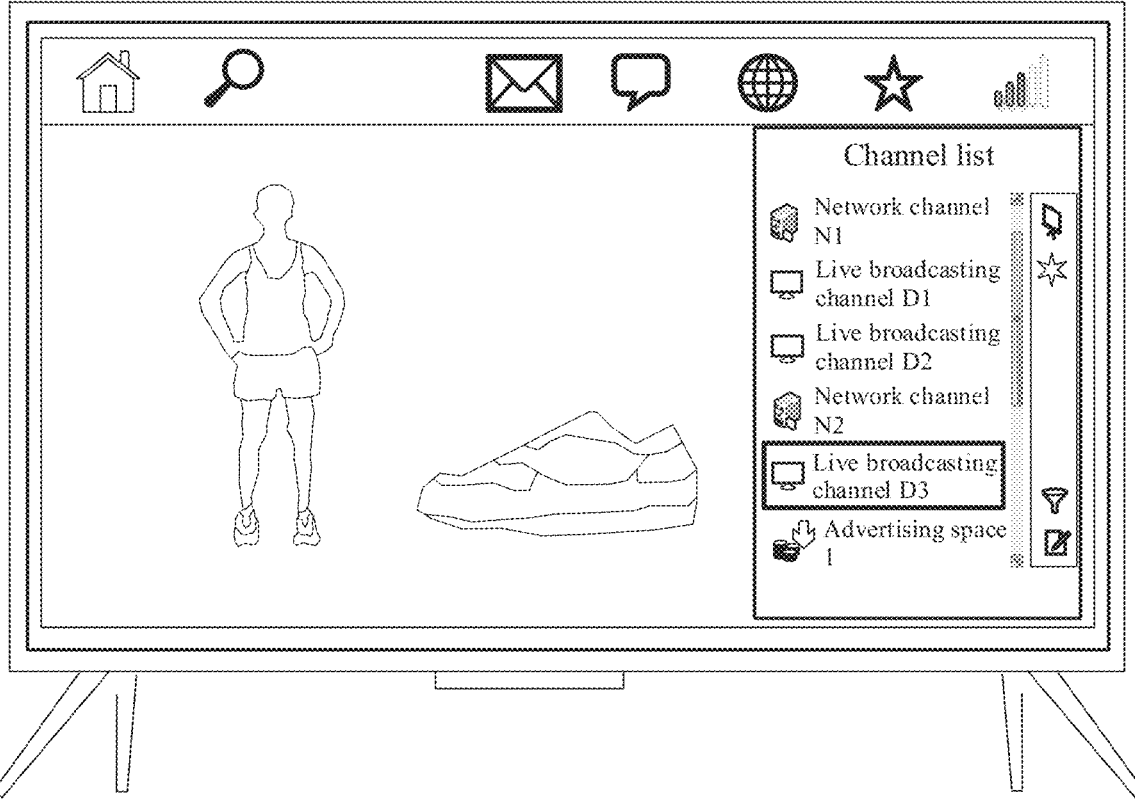
FIG. 9A is a schematic diagram of a user interface of a smart television for channel switching according to some embodiments.

FIG. 9A is a schematic diagram of a user interface of a smart television for channel switching according to some embodiments.

In some embodiments, the display apparatus includes a display. The user may control the user interface of the display to display a channel list by operating the remote control. In the user interface shown in FIG. 9A, the channel list includes two types of channels, that is, live broadcasting channels and network channels. The user interface may further include an advertising space from a service provider. For example, the channel list shown in FIG. 9A includes a network channel N1, a network channel N2, a live broadcasting channel D1, a live broadcasting channel D2 and a live broadcasting channel D3, and a channel currently being played on a smart television is the live broadcasting channel D3. When a channel switch command is received, a channel object for the channel switch command may be a live broadcasting channel or a network channel, and due to different data sources of different types of channels, the smart television has different display solutions for the live broadcasting channels and the network channels in a channel switch process.

The smart television may maintain a channel list. The channel list records channel information of digital television (DTV) channels and over the top (OTT) (web) channels, and DTV channels and OTT channels may be combined in the channel list. When the user clicks a button for channel switching, in response to the selection of the button, a channel to be switched may be a DTV channel or an OTT channel. For example, when the channel switch command for switching to an OTT channel, the smart television is required to obtain audio and video resources from the OTT channel and start a browser application corresponding to OTT channel to play the OTT channel. Alternatively, a channel switch command is to quickly switch the current OTT channel into a next DTV channel, the smart television is required to wait for two processes of loading the resources of the current OTT channel and starting the browser application to be completed before starting to switch from the current OTT channel to the DTV channel. 50 ms to 100 ms are generally spent on loading the audio and video resources, and 3 s to 5 are generally spent on starting the browser application. Therefore, when different types of channels are quickly switched, the browser may need a relative long time to switch to a network channel.

In some embodiments, each row in the channel list indicates channel information corresponding to one channel. The channel information includes one or more of a channel sequence number, a channel identity (ID), a channel name, and a channel type.

In some embodiments, the channel sequence number is used for marking a sequence position of a channel in the channel list such that the channel may be conveniently positioned. The channel ID is used for identifying and distinguishing each channel, each channel has a unique ID, and any two channels have different IDs. The channel name indicates a real name of the channel. The channel type is used for marking whether the channel is a DTV channel or an OTT channel, that is, marking a signal source of the channel.

In some embodiments, DTV channels and OTT channels are recorded in the same channel list. The DTV channels and the OTT channels may be sorted in a mixed manner, and through this record method, a user may alternately watch the DTV channels and the OTT channels. For example, a channel currently watched by a user is a network channel 1 with a sequence number of 001, and if the user presses a button for channel switching once, the current channel is required to be switched to a live broadcasting channel 1 with a sequence number of 002, that is, a channel type is switched from an OTT channel to a DTV channel, the OTT channel is a network channel, and the DTV channel is a live broadcasting channel. For another example, if another channel switching command is received, for example by operating the button for channel switching, the channel to be switched is a live broadcasting channel 2 with the sequence number of 003, and at this time, the channel type is still kept as the DTV channel. When yet another channel switching command is received, the channel to be switched is a network channel 2 with a sequence number of 004, and at this time, the channel type is switched into the OTT channel. This mixed-sequence of channels results in frequent changes of channel types.

A two-way change between a DTV channel and an OTT channel is essentially a change between a physical signal source and a browser application, and resource management, that is, a process for waiting for application resource release, is required for each change. When different types of channels are quickly switched, a change speed is slow, time consumption for waiting for responding to each change request is long, an updated channel may not be quickly switched, and viewing experience of a user is influenced.

Figure 9B:
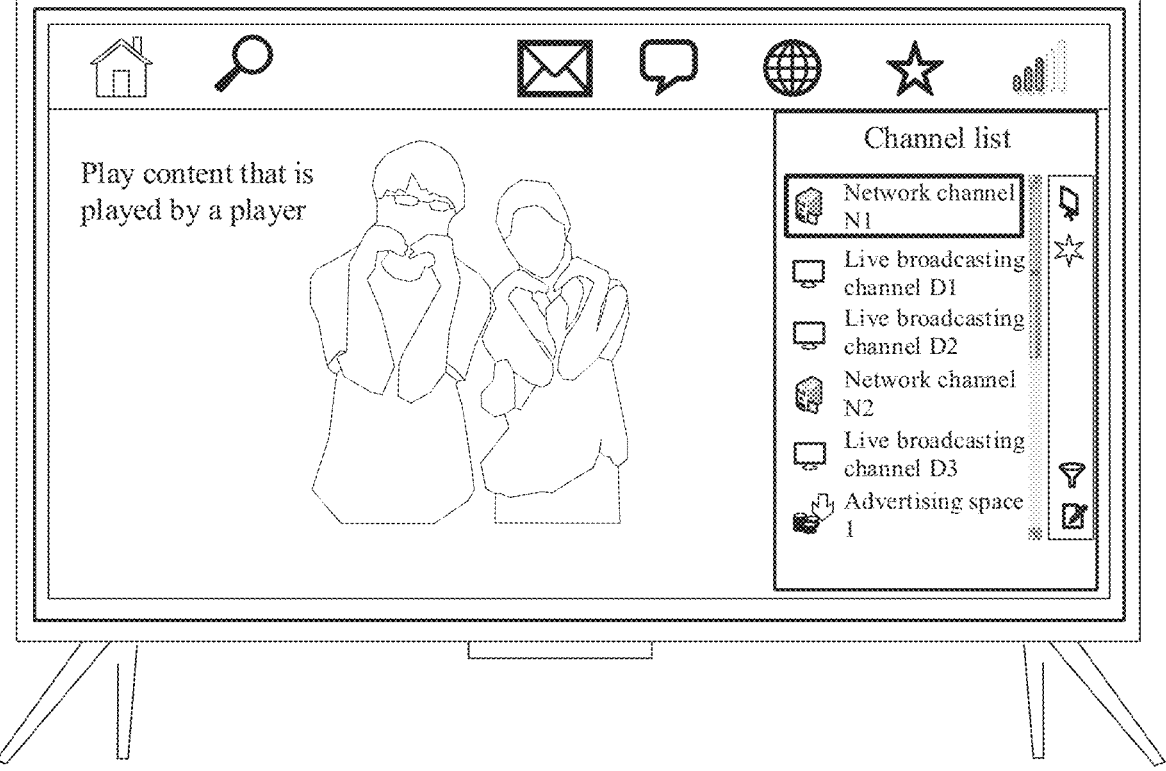
FIG. 9B is a schematic diagram of a user interface of a smart television for channel switching according to some embodiments.

FIG. 9B is a schematic diagram of a user interface of a smart television for channel switching according to some embodiments.

In some embodiments, when the smart television plays an OTT channel, a controller of the smart television sends a channel switch command to a player. For example, the player may be implemented as HiPlayer. After receiving the channel switch command from the controller, the player parses a message carried in the channel switch command, and replaces a uniform resource locator (URL) in the player with a video uniform resource locator of a target network channel after change.

In some embodiments, a first controller of the smart television receives a channel switch command from a user. The channel switch command is used for switching the channel currently played on the smart television to a first network channel in a channel list. For example, the user may operate in a user interface shown in FIG. 9A, the channel currently being played is the live broadcasting channel D3, and a command for switching from the live broadcasting channel D3 to the network channel N1 may be issued from a user via a remote control. After the user operates the remote control, the first controller receives a channel switch command for switching from the live broadcasting channel D3 to the network channel N1. The first controller may determine, on the basis of the received channel switch command, a uniform resource locator of the network channel N1, that is, the first uniform resource locator, by querying channel information stored in the channel list. The smart television accesses the uniform resource locator corresponding to the network channel N1, and may play content from the network channel N1.

In some embodiments, after obtaining the first uniform resource locator, the first controller controls the player to play, on the basis of the first uniform resource locator, the first network channel corresponding to the first uniform resource locator on the user interface of the smart television.

In some embodiments, the smart television does not play the network channel N3 on the basis of a browser application, but plays the network channel N3 on the basis of a player. Compared with a browser having compatibility of presenting multimedia such as texts, documents, web pages, pictures, videos, and audios, the player playing video resources has more advantages in loading videos, rendering pictures, combining audios and videos and being compatible with different types of video formats, and when the video resources are played by a player, a corresponding speed is higher, and playing is more stable.

In some embodiments, when the network channel N3 is played by the player, the player is required to be in a started state in the system of the display apparatus, for example, the player is required to be started along with system startup of the display apparatus.

In some embodiments, the smart television displays and plays network channels by means of the player in a channel switch process such that the first controller controls the player to only display content from the first network channel when playing the first network channel. Only presenting the content from the first network channel means that display of the player in a user interface is different from appearance of the player playing a video in a normal condition.

The smart television plays the network channels by means of the player in a channel switch process, such that a frame boarder, a volume control, a brightness control, a progress bar control, etc. may not displayed. Moreover, only a play content in a play content region is displayed, such that a picture effect of playing a network channel via the player is the same as a picture effect of playing a live broadcasting channel, which is as shown in FIG. 9B.

In some embodiments, the player only displays the play content from the first network channel when playing the first network channel, the controller of the smart television controls, on the basis of a current display resolution configured in the display apparatus, the play content of the player to be displayed on a user interface of a television in a full-screen mode, and the play content does not display a control in a channel switch process. Controls include a progress bar control, a pause control, a start control, a stop control, etc.

Figure 9C:
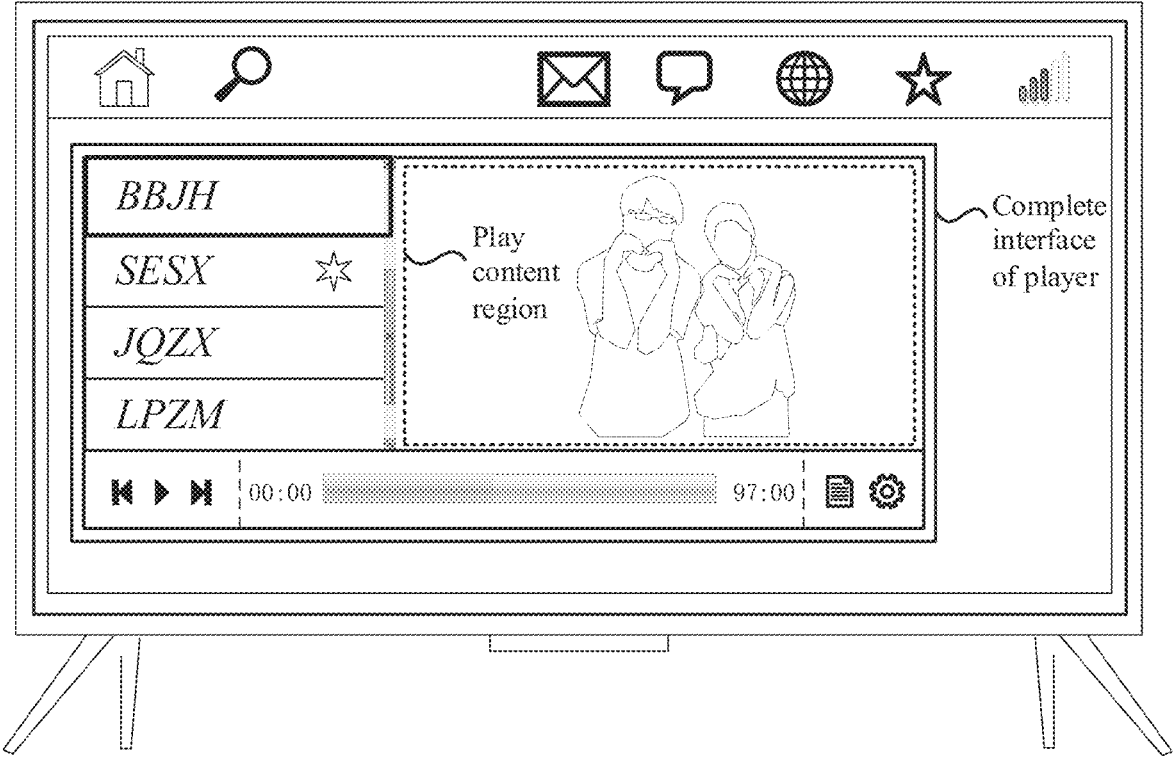
FIG. 9C is a schematic diagram of a user interface of a player of a smart television in a non-channel-change scenario according to some embodiments.

In some embodiments, in a non-channel-switch scenario, for example, the player plays the movie BBJH, a user interface of the player may display a complete playing interface including a frame border, a video list, a control area, a play content region, etc., which is as shown in FIG. 9C.

By comparing the complete playing interface of the player as shown in FIG. 9C with the play content interface as shown in FIG. 9B, it can be found that for the smart television provided in the present disclosure, in a network channel switch process, the player only displays the above play content region, that is, a user may only see a play content portion in the television, and the other elements, controls and functions of the player may not be seen or operated by the user, such that the function of switching to a network channel and playing the network channel by the player are achieved.

Figure 9D:
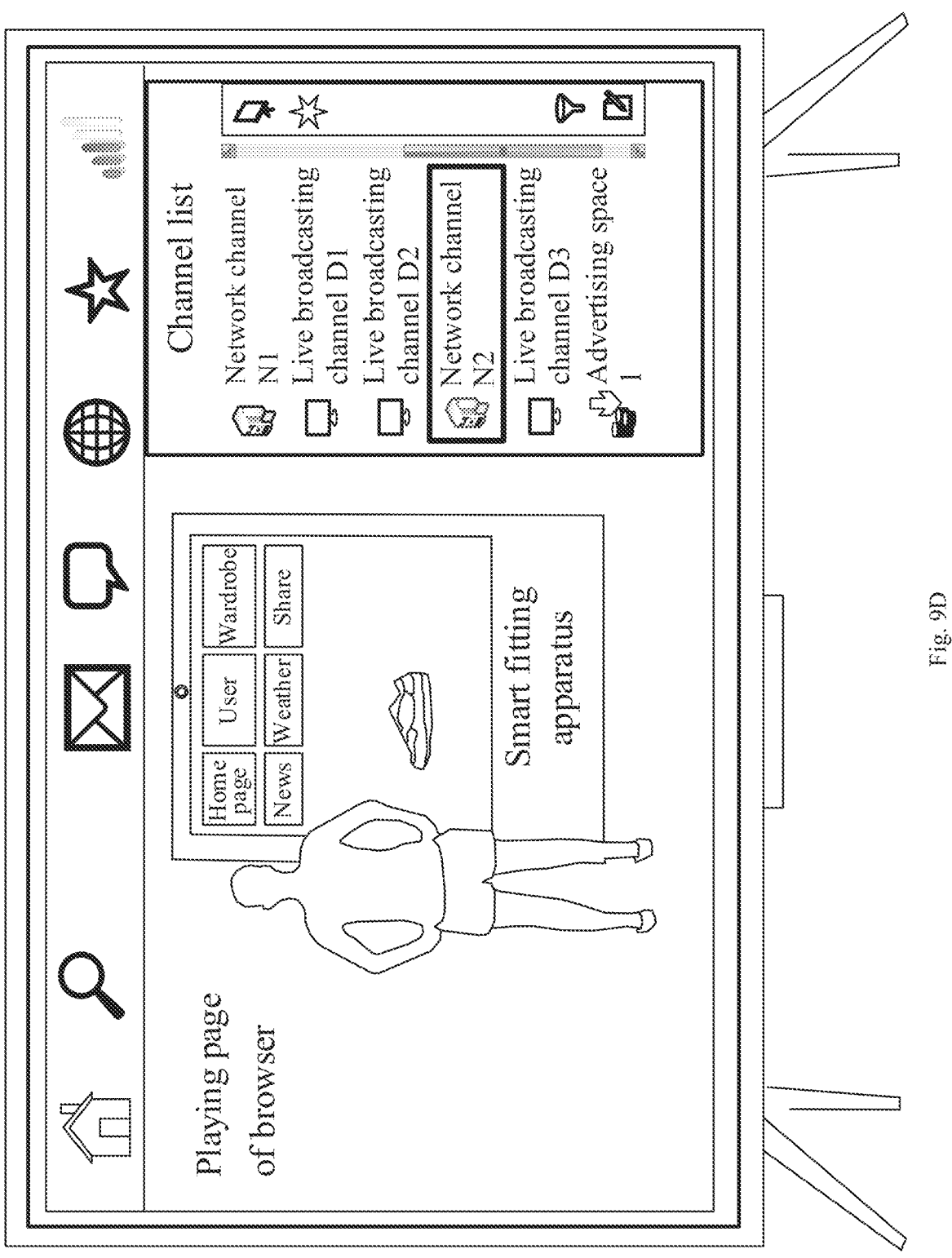
FIG. 9D is a schematic diagram of a user interface of a smart television for channel switching according to some embodiments.

FIG. 9D is a schematic diagram of a user interface of a smart television for channel switching according to some embodiments.

In some embodiments, the player plays a network channel, and if the user interface does not display the content from the first network channel within a preset period of time, the controller of the smart television will control, on the basis of the browser refreshing mechanism, the browser to refresh the playing page for presenting the player again, which is as shown in FIG. 9D.

Although the user interface in FIG. 9D is basically the same as that in FIG. 9B, playing mechanisms for video resources in the two figures are different. In FIG. 9B, a video is played and displayed by the player, while in FIG. 9D, a video resource is played and display by the browser.

If playing network channel via the player in the system is failed, the smart television may achieve a channel switch mechanism again by replaying the network channel by means of the browser, so as to solve the problem that a channel switch may not be achieved due to unexpected faults like player failure, etc.

For another example, an OTT module in a television system that may be used for controlling a network channel switch sends a channel switch message to the player in the system of the display apparatus, and registers a timer in the system while sending the channel switch message, for example, the timer may be preset for 3 s.

The player registers message monitoring in the background of the display apparatus, so as to obtain the channel switch message from the OTT module at any time, and determines the type of the message after receiving the message sent from the OTT module.

If the message received is a channel switch message, the player parses a URL contained in a message body, and changes the parsed URL into a source (src) of a video. If the message received by the player is a non-channel-switch message, the player executes other tasks. In some embodiments, a format of the channel switch message is {"type": "message", "source": "UI", "target": "player", "event": "channelswitched", "channelInfo": channelUrl: , channel-Name: }. Whether the message received by the player is a channel switch message or a non-channel-switch message may be distinguished by means of the field "event" in the channel switch message, for example, when "event" is "channelswitched", the message received by the player is anon-channel-switch message.

After playing content from the uniform resource locator of the network channel, the player sends a feedback message to the OTT module, so as to notify the OTT module whether playing the network channel is successful. Before timing of the timer ends, the OTT module determines whether a message for indicating whether the channel switch is successful returned from the player is received within 3 s.

If the channel switching in the player is successful, timing of the timer is cancelled. If the channel switching in the player is not successful, the OTT module starts, through an original refreshing method for a web page, a playing page of the player to play a network channel, and the timer is stopped, whose schematic logic diagram is shown in FIG. 10.

S1001, Register message monitoring.

S1002, Receive a channel switch message from OTT module.

S1003, Determine whether to switch a channel.

S1004, If it is determined to switch the channel, parse URL contained in a massage body and change the parsed URL into a source of a video; if it is determined not to switch the channel, the flow goes to S1006.

S1005, Send a feedback message to the OTT module.

S1006, Execute other operations.

S1007, OTT module sends a channel switch message and set a timer for 3 s.

S1008, Determine whether a message for indicating whether the channel switch is successful returned from the player is received within 3 s.

S1009, If it is determined the message is not received, OTT module starts, through an original refreshing method for a web page, a playing page of the player to play a network channel, and stops the timer.

S1010, If it is determined the message is received, OTT module cancels the timer.

In the above message interaction process, when the OTT module sends a message to the player, the timer is required to be started at the same time. If the OTT module receives a feedback message for indicating a successful channel switching from the player within 3 s, it is determined that the channel is successfully switched. If the OTT module does not receive the feedback message from the player within 3 s, it is determined that the player does not receive the channel switch message, and at this time, the player will be restarted by changing a signal source (for example, by means of the browser), so as to prevent the player from failing to receive the feedback message due to abnormal exit. In some embodiments, the controller may control, on the basis of a first uniform resource locator of a target network channel to be switched, the playing page of the browser to replay the first network channel, so as to ensure a successful network channel switch.

In some embodiments, in order to guarantee that the player may play a corresponding network channel in a network channel switch process, after a channel switch command is received, the controller of the smart television determines whether the player is started in the system of the display apparatus. When the player is started, the controller controls the player to play a first network channel on a user interface on the basis of a first uniform resource locator corresponding to the first network channel.

If the controller determines that the player is not started and there is no player in the background, the controller controls, on the basis of the refreshing mechanism, the browser to refresh the playing page for presenting the player, and then plays the first network channel on the playing page on the basis of the corresponding first uniform resource locator, so as to connect and change a network channel again when the player fails.

Figure 11:
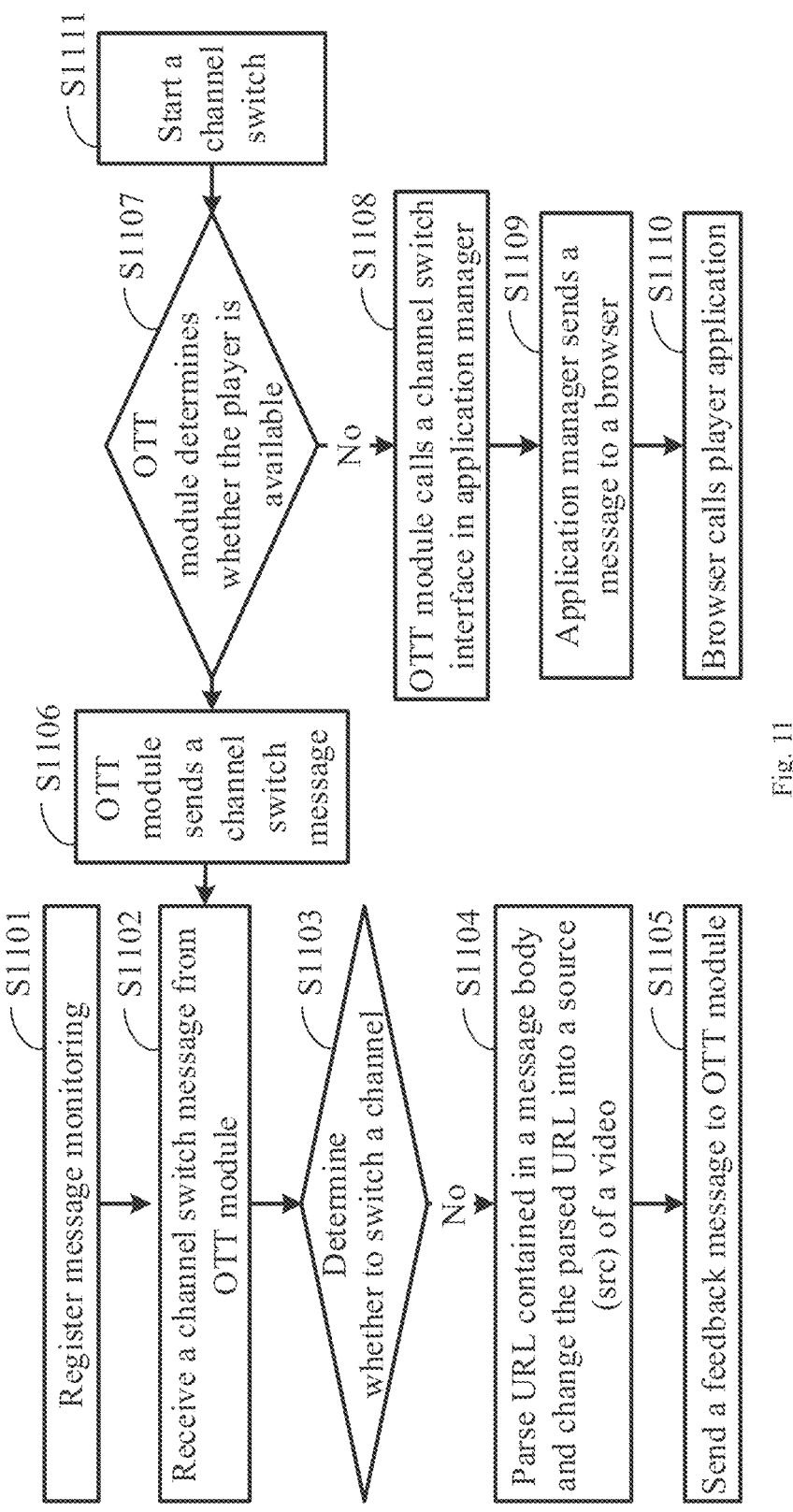
FIG. 11 is a schematic flow diagram for processing data when a network channel is switched according to some embodiments.

Different from setting the timer, after a channel switch operation is received, the controller, or the controller implemented in the OTT module, will determine whether the player is available for use in current operating system of the display apparatus. If the player is available in the current operating system, a channel switch message is sent to the player, and then a channel is switched by means of the player. If the player is not available, the OTT module will call a channel switch interface in application manager to send a message to the browser, and control, by means of the refreshing mechanism, the browser to call up a player application to play a network channel on a playing page of the browser, so as to switch to the channel. The schematic logic diagram of performing channel switching via a player to performing channel switching via a browser is shown in FIG. 11.

S1101, Start a channel switch.

S1102, OTT module determines whether the player is available.

S1103, If the player is unavailable, OTT module calls a channel switch interface in application manager.

S1104, Application manager sends a message to a browser.

S1105, Browser calls player application.

S1106, If the player is available, OTT module sends a channel switch message.

S1107, Register message monitoring.

S1108, Receive a channel switch message from OTT module.

S1109, Determine whether to switch a channel.

S1110, If it is determined not to switch a channel, parse URL contained in a message body and change the parsed URL into a source (src) of a video.

S1111, Send a feedback message to OTT module.

In some embodiments, when another channel switching command is received, for example a channel switch command for switching from a first network channel to a second network channel, the controller continues to determine a second uniform resource locator corresponding to the second network channel through the above method.

Then the controller sends the second uniform resource locator to the player to replaces the existing first uniform resource locator, and controls the player to play the second network channel on the user interface on the basis of the second uniform resource locator.

In some embodiments, in a network channel switch process, since a speed of playing a video via a player is higher than that of playing via a browser, the controller immediately replaces the uniform resource locators corresponding to different network channels in the player such that a picture of a channel to the switched may be immediately played.

In some embodiments, an OTT live video playing module is introduced into the smart television in the present disclosure, and a user may view a current OTT channel information list in a live television mode, select a specific channel to play, change a channel by means of channel up and down keys, etc.

Figure 12:
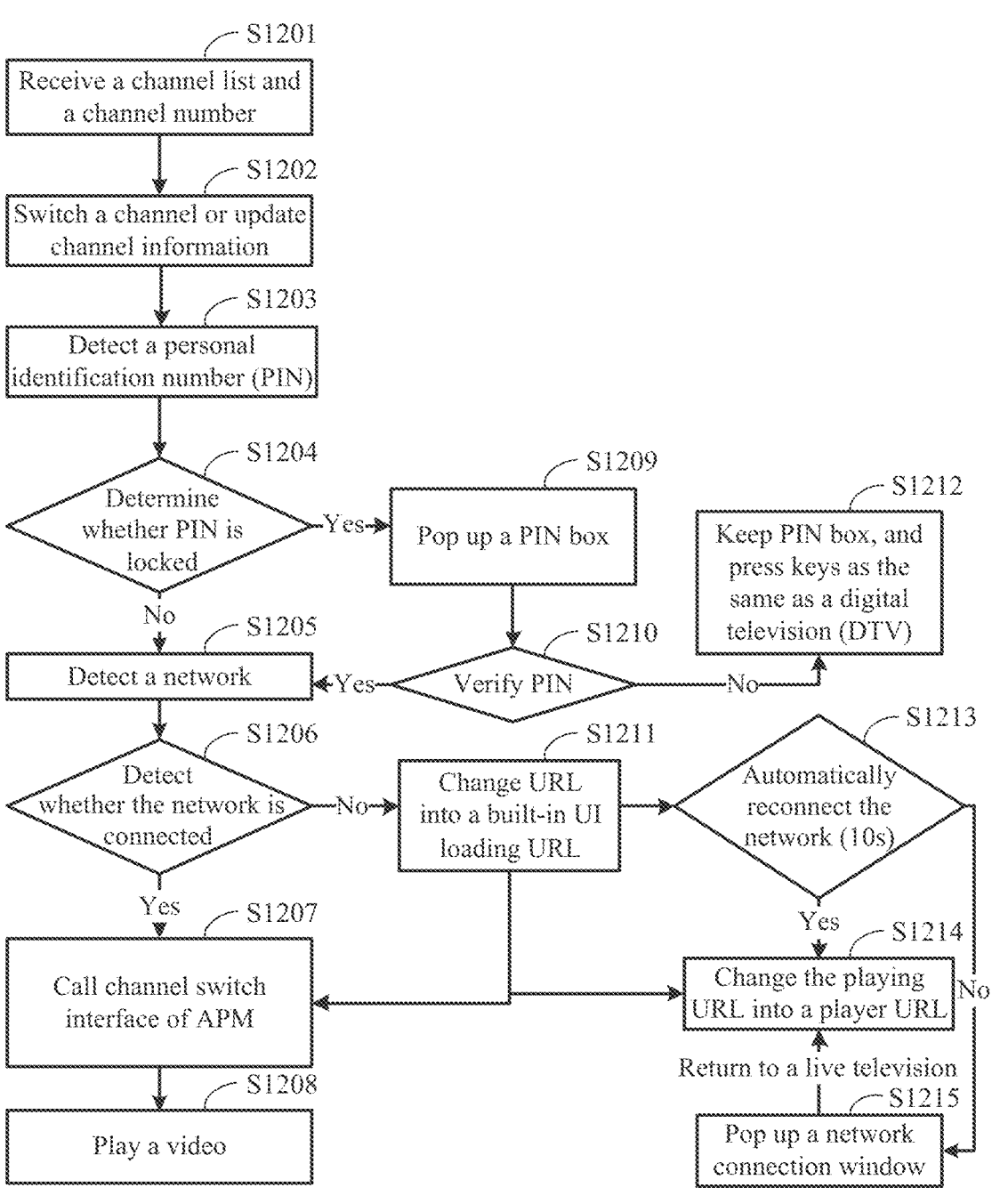
FIG. 12 is a schematic flow diagram for processing data when a network channel is switched according to some embodiments.

The controller of the television obtains channel data and program data from a cloud and stores the channel data and program data in a database (local database). When a certain channel in an OTT channel list is selected by a user, OTT module will start a browser via Application Manager (APM) to start a local player application, and the player will start to play a video by parsing various parameters in a URL and set a size of a playing interface according to a current resolution of the display apparatus. A player application for channel switching displays no progress bar and no video pause control and no video pause control and start control in a user interface. There is a loading circle prompt in a video loading process. When a video encounters a playing error, the player may play a network channel again via a reconnection mechanism. The controller controls, on the basis of a browser refreshing mechanism, a browser to refresh a playing page for presenting the player to play a network channel, and the schematic logic diagram of which is as shown in FIG. 12.

S1201, Receive a channel list and a channel number.

S1202, Switch a channel or update channel information.

S1203, Detect a personal identification number (PIN).

S1204, Determine whether PIN is locked.

S1205, If it is determined PIN is not locked, detect a network.

S1206, Detect whether the network is connected.

S1207, It is determined the network is connected, call channel switch interface of APM.

S1208, Play a video.

S1209, If it is determined PIN is locked, pop up a PIN box.

S1210, Verify PIN; if PIN is verified, the flow goes to S1205, otherwise, the flow goes to S1212.

S1211, If the network is not connected, change URL into a built-in UI loading URL.

S1212, Keep PIN box, and press keys as the same as a digital television (DTV).

S1213, Automatically reconnect the network (10 s).

S1214, If it is reconnected the network, change the playing URL into a player URL.

S1215, If it is not reconnected the network, pop up a network connection window, and then return to a live television.

The present disclosure further provides a quick channel switch and display method for a network channel. The method includes: receive a channel switch command for switching from a current channel to a first network channel in a channel list from a user; determine a first uniform resource locator corresponding to the first network channel on the basis of the channel switch command; and control a player of the display apparatus to play the first network channel on the basis of the first uniform resource locator. The player is started along with startup of the display apparatus, and the player only displays a play content of the first network channel when playing the first network channel.

In some embodiments, after controlling a player to play the first network channel on a user interface according to the first uniform resource locator, the method further includes: when content from the first network channel is not displayed within a preset period of time, control, on the basis of a browser refreshing mechanism, a browser to refresh a playing page for presenting the player; and control the playing page of the browser to replay the first network channel according to the first uniform resource locator.

In some embodiments, after the channel switch command for switching from a current channel to a first network channel from the user is received, the method further includes: determine whether the player in the display apparatus is started; if the player is started, control the player to play the first network channel on the user interface on the basis of the first uniform resource locator; and otherwise, control, on the basis of the browser refreshing mechanism, the browser to refresh the playing page for presenting the player, so as to cause the playing page to replay the first network channel on the basis of the first uniform resource locator.

In some embodiments, the player only displays the play content of the first network channel when playing content from the first network channel, specifically, on the basis of a current resolution configured for the display of the display apparatus, the play content of the player is controlled to be displayed in a full-screen mode, the play content does not display one or more controls in a channel switch process, and the one or more controls include, but is not limited to, a progress bar control, a pause control, a start control, and an end control.

In some embodiments, after a channel switch command for switching from a first network channel to a second network channel from a user is received, the controller is further configured to: determine a second uniform resource locator corresponding to the second network channel, and send the second uniform resource locator to the player to replace an existing first uniform resource locator; and control the player to play the second network channel on the basis of the second uniform resource locator.

According to an embodiment of the present disclosure, by using the channel switch command, the player obtains the uniform resource locator of the network channel. The network channel is played by the player to realize the network channel switching. Further, by only presenting the play content, a display effect of the live broadcasting television is achieved, there is no need to invoke the browser for playing network channel during network channel switching process, thus there is no need to repeatedly refresh the browser page during network channel switching, video loading and rendering time is reduced, data transmission time is reduced, system resource consumption is reduced, a channel switch response speed is improved, and matching and synchronization between channel switch and display of the television and an operation of the remote control are improved.

Traditional signal sources include physical channels such as a digital visual interface (DVI), a television (TV), an AV, a high definition multimedia interface (HDMI), a video graphics array (VGA), and a component connector. However, as internet and applications (APPs) are run in televisions, the network channels also become mainstream signal sources of televisions, and corresponding channels playing network channels by means of video applications may also be called virtual channels.

In some implementations of presenting and controlling a virtual channel of a television, when the television is switched from a physical channel to a virtual channel, a user is required to start a video application on a television desktop by means of a remote control first, and then select a live broadcast function of the video application, so as to achieve live broadcast of a corresponding network channel by means of the video application.

However, compared with a situation that an operation menu of a key of a television body may directly support switches between different physical channels generally, the situation that switches between the physical channels and the virtual channels are achieved by means of a remote control requires more operation steps. Moreover, in a scenario where the remote control is lost, the user may not directly switch from a current channel to a virtual channel by means of the key on the television body, and may not indirectly start the video application on the desktop by means of the key on the television body to enter the virtual channel.

In view of the above issues, the present disclosure provides a display apparatus, a server and a display and a control method for a virtual channel switching.

Figure 13A:
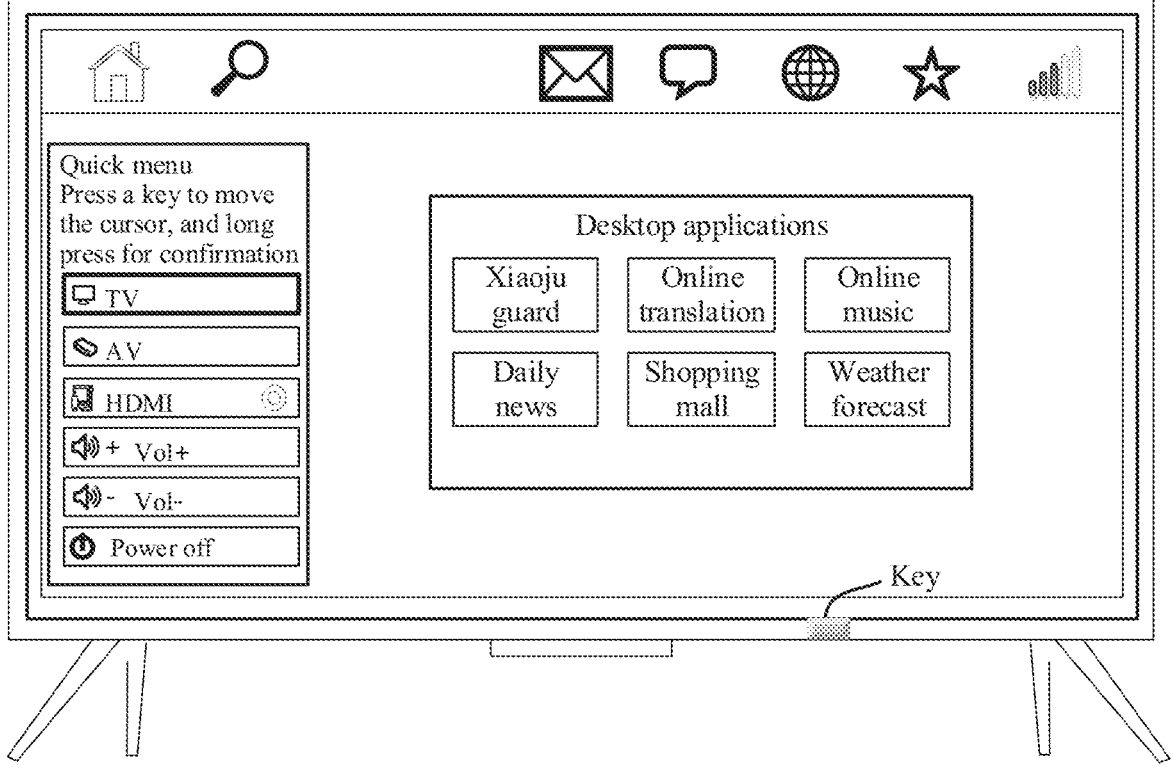
FIG. 13A is a schematic diagram of a user interface of a key menu of a smart television according to some embodiments.

FIG. 13A is a schematic diagram of a user interface of a key menu on a smart television according to some embodiments.

In some embodiments, the display apparatus includes a key arranged on a body.

For example, the key is arranged at an edge of a frame of a smart television, and after a user presses the key, the controller of the smart television receives a first command for starting a first menu, and controls a user interface of a display to display the corresponding first menu. The first menu may be used for configuring basic functions of the smart television, such as configuring volume, signal source selection, and power on-off.

In some embodiments, a lower border of the smart television is provided with one key, and after the user normally presses the key for the first time, the user interface will display the first menu as shown in FIG. 13A, that is, a quick menu at a left side of the figure. Contents that may be displayed by the first menu include a plurality of signal sources, such as three physical channel of TV, AV and HDMI, and the first menu may further display two keys for adjusting a volume and a power key for turning on and off the smart television.

In some embodiments, the first menu of the smart television may be differently configured according to different function configurations, for example, the first menu may be configured to display a key for channel switching, a key for searching a remote control, etc.

In some embodiments, the smart television may be further provided with various numbers of keys at other positions of the frame thereof or at other positions of a body thereof, for example, five keys, three keys, seven keys, etc.

For example, if the smart television is configured with five keys, the keys generally include one function key, two volume key and two channel switch keys, and the number and specific operation functions of the keys may be set according to actual requirements.

In some embodiments, for a smart television configured with only one key, a user may operate the first menu by causing this key to have multiple functions.

For example, a cursor on a user interface is moved, that is, a focus is moved, by quickly pressing a key on a remote control; and then a selected option is confirmed or a secondary menu thereof is started to be operated by long pressing the key.

Figure 13B:
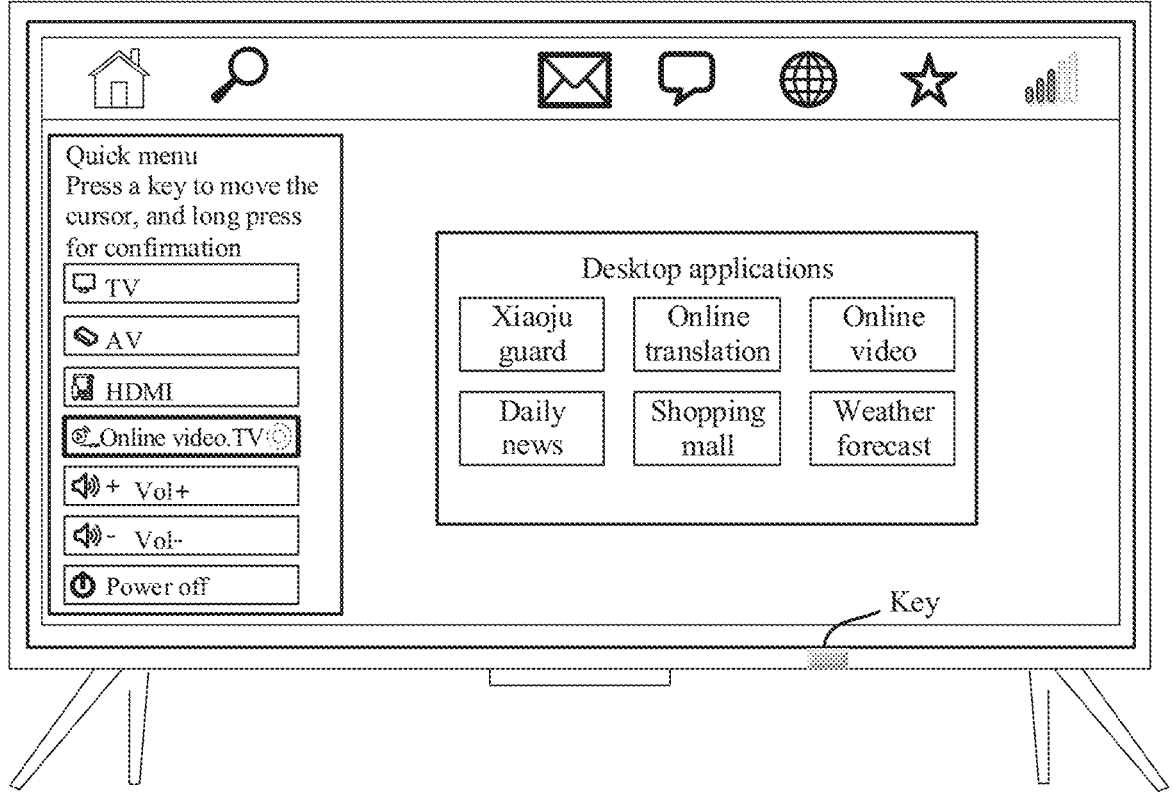
FIG. 13B is a schematic diagram of a user interface of a key menu of a smart television according to some embodiments.

FIG. 13B is a schematic diagram of a user interface of a key menu of a smart television according to some embodiments.

The key configured on the television is a basic part of the television, and since the birth of remote control, functions of the keys on the remote control are increasingly weakened. Furthermore, the keys are simplified gradually, for example, seven keys are simplified into five keys, and then are simplified into a single key commonly used nowadays, and the key only has original basic functions of the television.

Increasingly rich network contents supported by the smart televisions are often controlled by a remote control. The key, as the simplest television control component, is not applied to control over the network contents. As network applications display network contents to televisions in a virtual channel manner, a key menu of a display apparatus provide in the present disclosure supports to display network virtual channels parallel to physical channels, and the virtual channels are selected and controlled to be played by repeatedly using a key.

In some embodiments, among a plurality of applications on a desktop of a smart television, online video applications, in addition to common video applications, also support online live broadcast functions, and may achieve live network channels.

In some embodiments, if a user who watches a live broadcast or a local video on a physical channel such as a TV, an AV and an HDMI wants to watch a live broadcast from a network channel of an online video application, the user is required to use a remote control to select an online video application among desktop applications, then start the online video application, and further select a live broadcast function of the online video application, so as to finally watch a live broadcast from a network channel.

It can be found that a plurality of operation are required in a process of achieving a live broadcast from a network channel, and if a user takes a live broadcast of a network channel of an online video application as a daily first choice, operations are quite inconvenient.

In some embodiments, the controller controls a first menu to display a virtual channel for entering a live broadcast of a network channel, the virtual channel is generally displayed in parallel with other physical channels, and the user may directly enter the live broadcast of the network channel application by means of a single selection operation.

When a user presses the key, the controller receives a first command of presenting a first menu which comes from operating the key, and the controller sends a second command comprising a device identifier to a cloud server.

For example, if there is only one online video application which can have a live broadcast locally on a smart television, the second command may carry a device identifier of the smart television, the device identifier may reflect information such as account number information of the smart television and permission information of the online video application, and a server may determine, according to the device identifier carried in the second command, whether the online video application has a permission to achieve a live broadcast of a network channel locally.

If the online video application has the permission and has ability to achieve a live broadcast of a network channel locally, the second command causes a server to determine a virtual channel that may be displayed in parallel with a physical channel in a smart television, so as to display the physical channel and the virtual channel in a first menu at the same time, and the virtual channel corresponds to an online video application that may play a network channel in the smart television.

In some embodiments, the server in the present disclosure includes a second controller, and after a user presses a key of a smart television, the second controller may receive a second command sent from the smart television. The second command includes a device identifier of the smart television, and the device identifier may reflect information such as account number information of the smart television and permission information of an online video application.

For example, by means of device information contained in the second command, the second controller of the server determines that the permission of the online video application of the smart television allows the television to achieve a live broadcast of a network channel, and then the second controller determines a first virtual channel that may be provided for the smart television. The first virtual channel corresponds to a first application that is installed in the smart television and may support to play a network channel, that is, the online video application in FIG. 13B.

After the second controller of the server determines that the online video application may be configured as a virtual channel, a third command is sent to the smart television. The third command contains a first virtual channel, and the third command may be used for enabling the smart television to configure a first virtual channel corresponding to display of the first menu according to the first virtual channel information contained in the third command, that is, to configure the first virtual channel and the physical channel to be displayed in parallel. Moreover, a mapping operation relation is built between a first virtual channel and a live broadcast of a network channel of an online video application.

In some embodiments, the first controller of the smart television receives the third command sent from the server, the third command comprising the first virtual channel determined by the second controller of the server.

On the basis of the first virtual channel information in the third command, the first controller of the smart television controls the user interface of the television to display the first menu comprising the first virtual channel, that is, after the user presses the key, the first menu may present a display effect including one or more physical channels and one or more virtual channel.

It should be noted that, after the user selects the first virtual channel and confirms the selection, the first controller starts a corresponding first application, that is, the online video application in FIG. 13B, so as to achieve a live broadcast of a corresponding network channel contained therein.

In some embodiments, the online video application displayed on the desktop of the smart television may be displayed in the first menu as an online video. TV, or in other forms, and the display form is determined by the server and sent to the smart television by means of the third command, so as to control the first menu of the smart television to realize presentation.

In some embodiments, the display apparatus in the present disclosure may achieve quick display and switches between a physical channel and a virtual channel via a key on the body of the display apparatus without a remote control. In order to achieve the purpose that the display apparatus in the present disclosure displays and operates a virtual channel via the key, the display apparatus includes a key menu module, a virtual channel data management module, an application management module, a physical channel management module, an application manager and an external support server at a system level.

Figure 14:
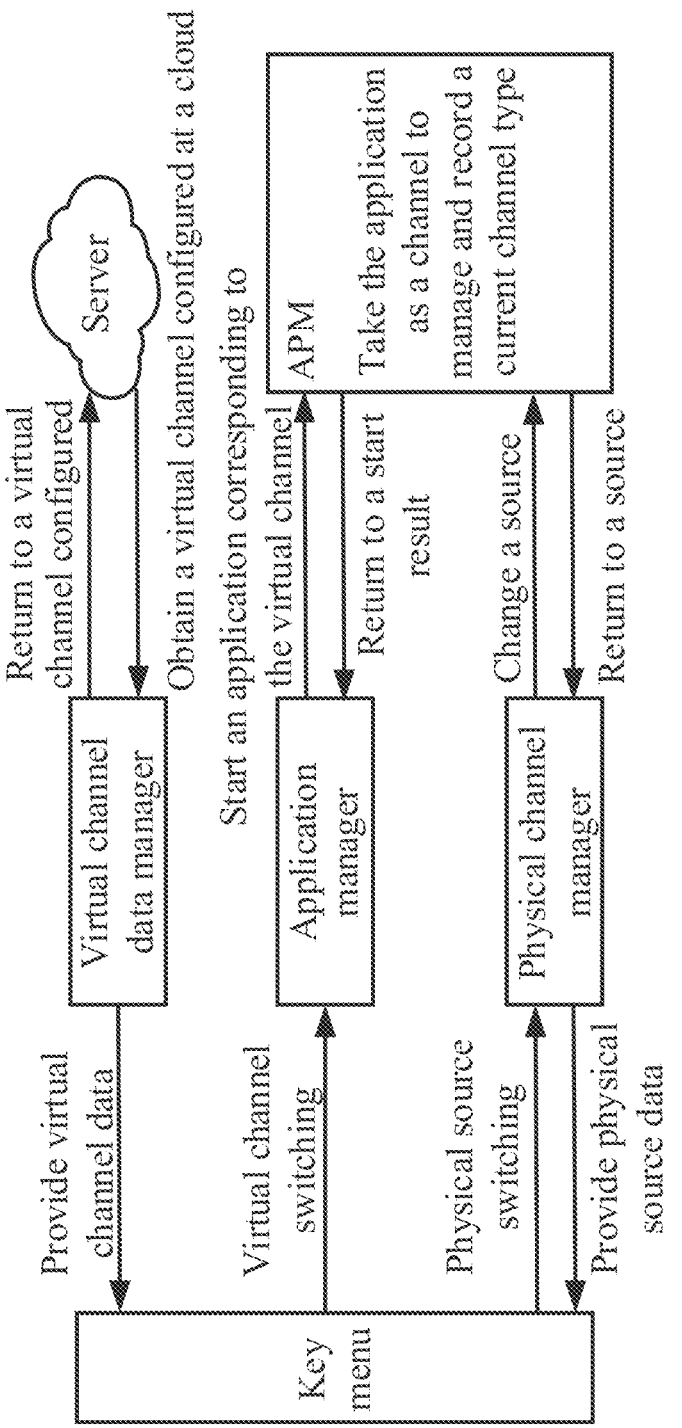
FIG. 14 is a schematic diagram of module interaction achieved by key functions of a smart television according to some embodiments.

The key menu module may display information such as a physical channel and a virtual channel, and realize quick channel switch control. The virtual channel data management module is used for obtaining virtual channel data that may be configured to a current country, a current network or a current account number from a cloud server, and providing the virtual channel data for a key menu to be displayed, and when the country, the network or the account number is switched, the virtual channel data management module obtains the virtual channel data again. The application management module controls a mode for starting a virtual channel to be the same as a mode for starting an application, and is in communication with Application Manager (APM) when a virtual channel in a user interface is switched, so as to start a corresponding application. The physical channel management module is used for providing data of a physical channel for the key menu to be used, and providing an interface for changing a physical channel to be in communication with the APM. The server is used for configuring a virtual channel that may be used. The APM unifies an application and a physical channel into sources to be switched, and records a current channel type. If the current channel is a physical channel, a channel management related interface of TV middleware is called for processing, and if the current channel is a process corresponding to starting an application or closing a specific application, a system architecture thereof is as shown in FIG. 14.

For example, when the smart television supports a virtual channel, the first controller configures a first virtual channel and a first physical channel as available video source options, and displays the available options in a first menu in parallel for a user to operate.

When the first virtual channel is started, a first controller controls a corresponding first application to be started on a user interface. When the first physical channel is started, the display apparatus is controlled to call television middleware to switch from a current video source into a corresponding video source via a signal source switch interface in a bottom layer.

In some embodiments, after a smart television is started, a user operates a key, and a first controller will determine whether a current user interface has a displayed menu page; if there is a display menu interface, a controller will cancel display so as to exit the current display page; and if there is no displayed menu page, the first controller will start a process for creating and displaying a first menu.

The first controller obtains a physical channel supported by the smart television from a physical channel management module, and pushes the physical channel to the first menu to be displayed; then the first controller continues to determine whether there is a virtual channel that may be supported in the smart television; if yes, the supported virtual channel is pushed to the first menu to be displayed; and then, other contents to be displayed are also pushed to the first menu to be displayed, for example, the contents may include channel up and down control, remote control finding control, a shutdown control, etc.

Figure 15:
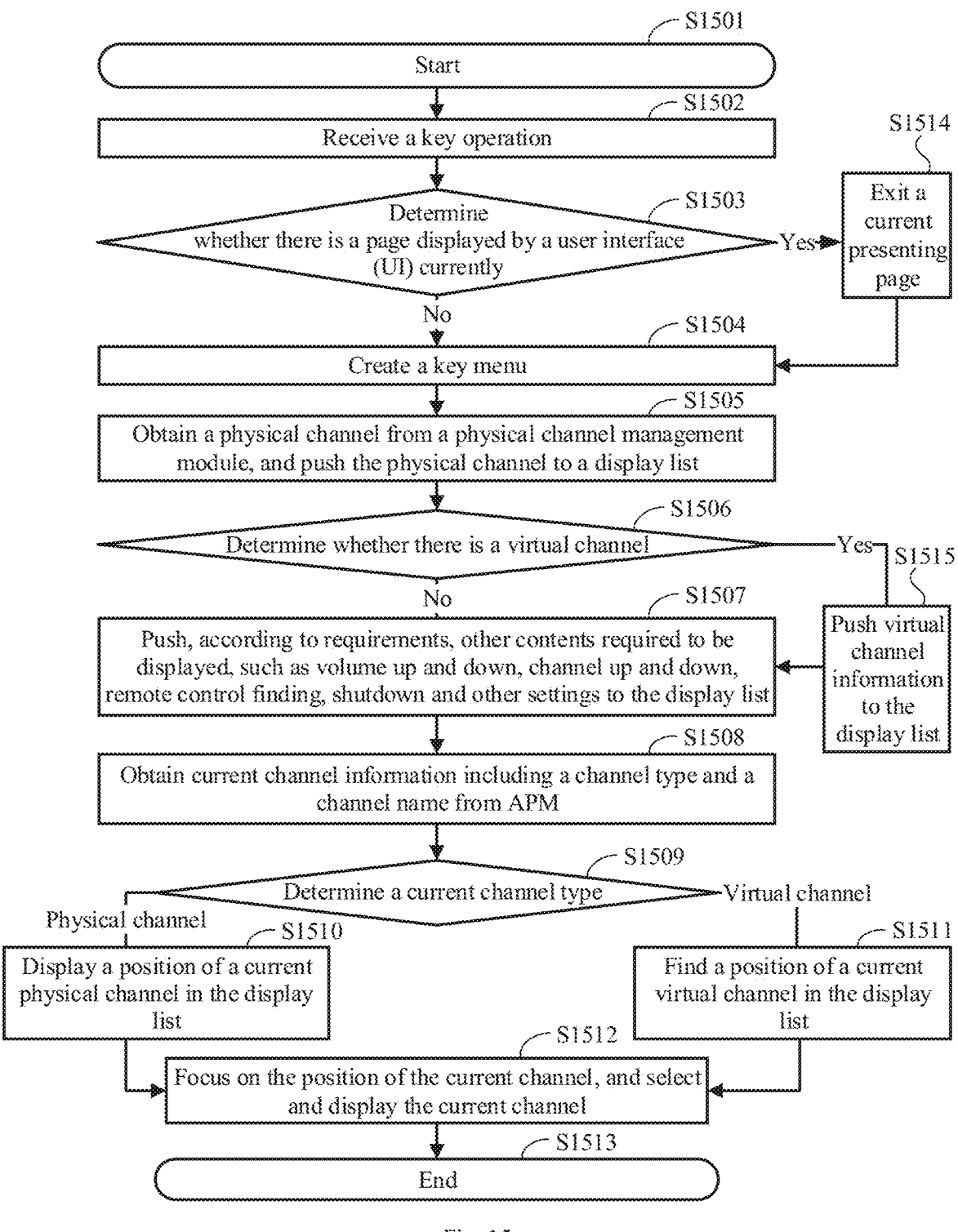
FIG. 15 is a schematic diagram of start logic of a first menu of a smart television according to some embodiments.

The first controller obtains names, that is, channel types of a physical channel and a virtual channel that are currently determined from an application manager according to display items in the first menu to be displayed. Further, the first controller determines a type of a current signal source of the smart television, so as to determine a position thereof in the first menu. Moreover, when the first menu is displayed on the user interface, a focus is controlled to be highlighted in the current signal source of the smart television, so as to complete control over display of the first menu, whose logic flow is as shown in FIG. 15.

S1501, The flow is started.

S1502, Receive a key operation.

S1503, Determine whether there is a page displayed by a user interface (UI) currently.

S1504, If it is determined there is not a page displayed by UI currently, create a key menu.

S1505, Obtain a physical channel from a physical channel management module, and push the physical channel to a display list.

S1506, Determine whether there is a virtual channel.

S1507, If it is determined there is not a virtual channel, push, according to requirements, other contents required to be displayed, such as volume up and down, channel up and down, remote control finding, shutdown and other settings to the display list.

S1508, Obtain current channel information including a channel type and a channel name from APM.

S1509, Determine a current channel type.

S1510, If the current channel type is a physical channel, display a position of a current physical channel in the display list.

S1511, if the current channel type is a virtual channel, find a position of a current virtual channel in the display list.

S1512, Focus on the position of the current channel, and select and display the current channel.

S1513, The flow is ended.

S1514, If it is determined there is the page displayed by UI currently, exist a current presenting page.

S1515, If there is a virtual channel, push virtual channel information to the display list.

Figure 13C:
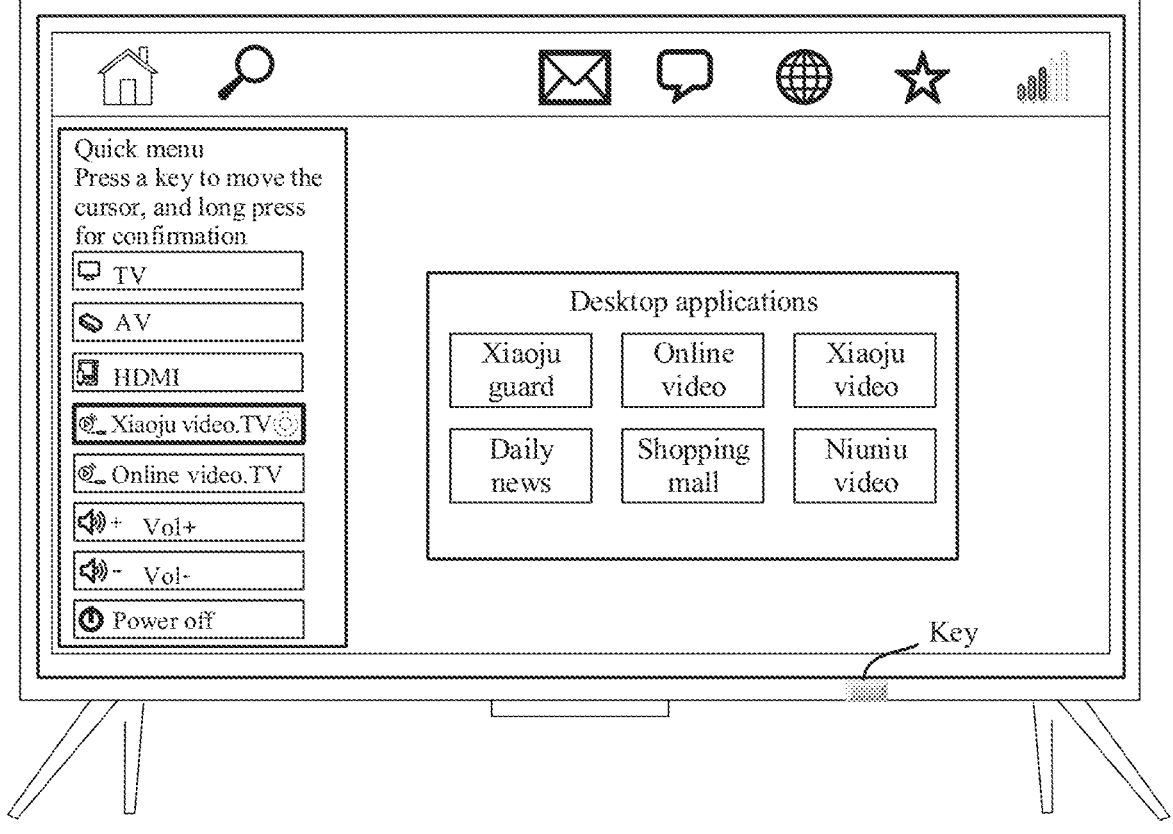
FIG. 13C is a schematic diagram of a user interface of a key menu of a smart television according to some embodiments.

FIG. 13C is a schematic diagram of a user interface of a key menu in a smart television in another embodiment of the present disclosure.

In some embodiments, a plurality of video applications are installed in the smart television, and a controller controls a first menu to display a first virtual channel and a second virtual channel, the first virtual channel and the second virtual channel corresponding to the applications which support live broadcasting.

For example, desktop applications of the smart television in FIG. 13C include three video applications, which are an online video, a xiaoju video, and a niuniu video. The xiaoju video and the online video both support live broadcasting of network channels, but the niuniu video does not support live broadcasting of network channels.

After a user presses a key, a first controller is configured to: in response to receiving a third command from the server, control the first menu to display a virtual channel online video.TV corresponding to an online video, a virtual channel xiaoju video.TV corresponding to the xiaoju video, the online video.TV and the xiaoju video.TV are the above first virtual channel and the above second virtual channel.

It should be noted that, for a video application that does not support live broadcasting of network channels locally on a smart television, the first menu will not display a corresponding virtual channel.

In some embodiments, the first menu may further include a second physical channel, and/or a second virtual channel, and/or a volume control, and/or a channel control, and/or a shutdown control. For example, the first menu physical channel in FIG. 13C includes a TV, an AV, an HDMI, etc., and further includes two volume adjustment keys, and two virtual channels, that is, an online video.TV and a xiaoju video.TV.

Figure 13D:
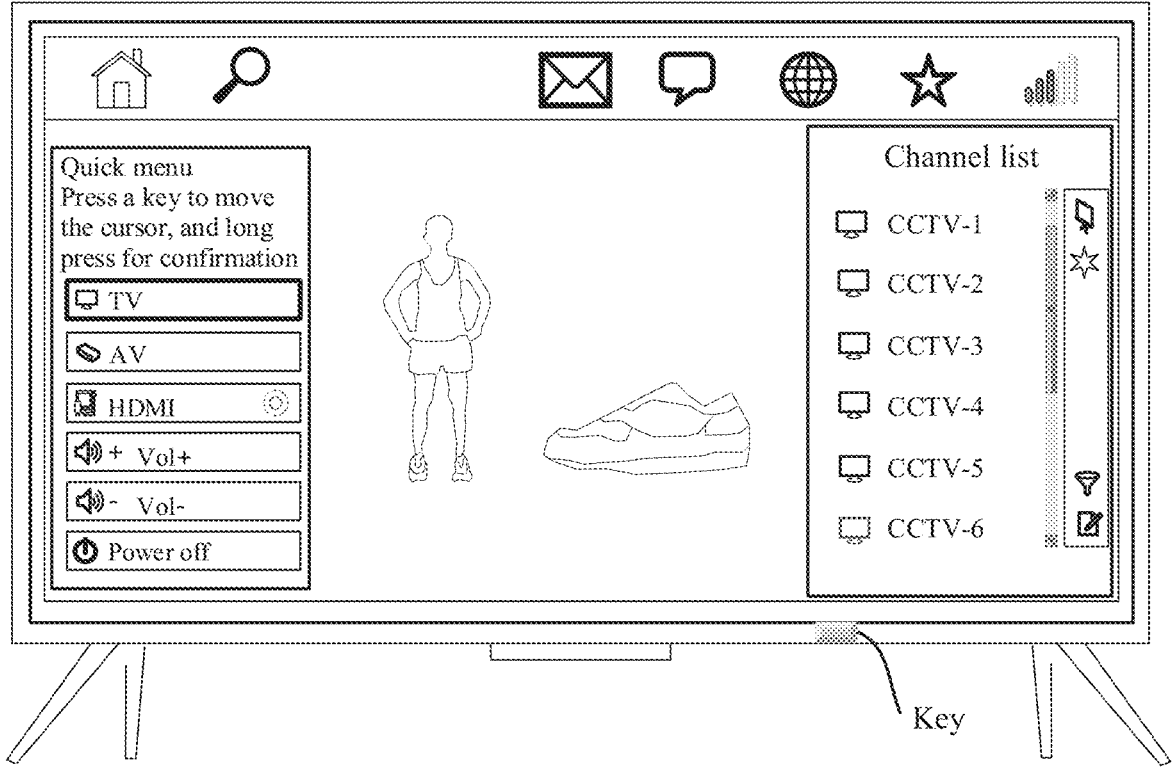
FIG. 13D is a schematic diagram of a user interface of a key menu of a smart television according to some embodiments.

FIG. 13D is a schematic diagram of a user interface of a key menu in a smart television in another embodiment of the present disclosure.

In some embodiments, a signal source of a smart television is a physical channel TV, that is, a conventional broadcast television signal source is used. When a channel list is configured as default display, a user interface at a TV signal source is as shown in FIG. 13D.

After a user presses a key, a first controller controls a first menu to be displayed on a user interface as shown in the figure, a focus is located at a TV physical channel option, and the channel list includes CCTV-1 to CCTV-6 as shown in the figure. The following description will be made for describing switches between a virtual channel and a physical channel by making the key to have multiple functions.

In some embodiments, when the user operates the key to control the focus on the user interface to change from a first virtual channel to a first physical channel adjacent to the first virtual channel, the first controller obtains pressing time spent on the key. By analysing the pressing time, the first controller identifies different key pressing operations as focus movement and operation confirmation.

For example, on the basis of the user interface shown in FIG. 13D, the user is required to switch a signal source from a TV physical channel to an online video.TV virtual channel, and the first controller will record and obtain pressing time of the key pressed from the user.

Figure 13E:
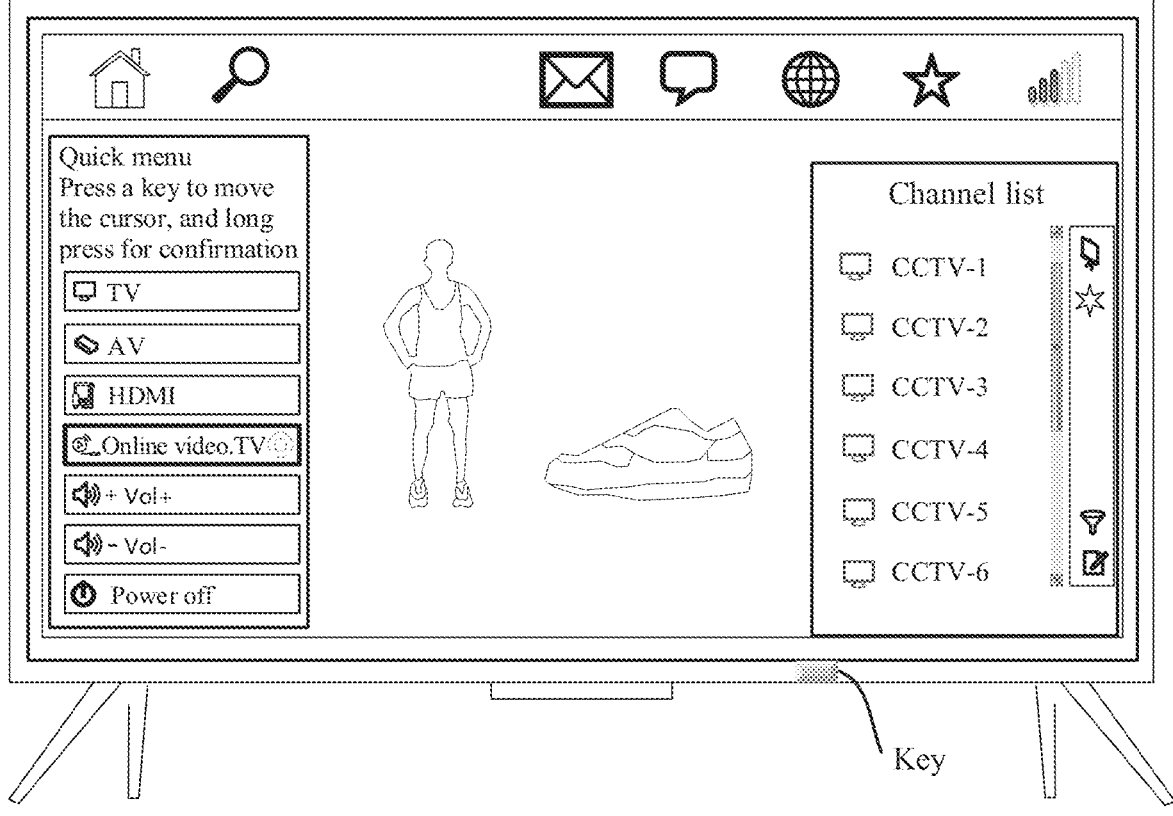
FIG. 13E is a schematic diagram of a user interface of a key menu of a smart television according to some embodiments.

If the pressing time is less than a first threshold, the focus is controlled to move from the physical channel TV to the first virtual channel online video. TV row by row. For example, the first threshold is set as 3 s, and if the pressing time of the key by a user is less than 3 s, the first controller will identify a key operation at this time as focus movement, such that the focus on the user interface will be moved from the physical channel TV to the online video. TV virtual channel is moved row by row on the basis of briefly pressing the key for three times, which is as shown in FIG. 13E.

In some embodiments, when the focus on the user interface is moved to the virtual channel online video. TV on the first menu, the user may press the key for a long time again. When the controller detects that the pressing time is greater than or equal to the first threshold, the first controller controls the first application online video corresponding to the virtual channel online video. TV to be started, so as to play a network channel on the user interface.

Figure 13F:
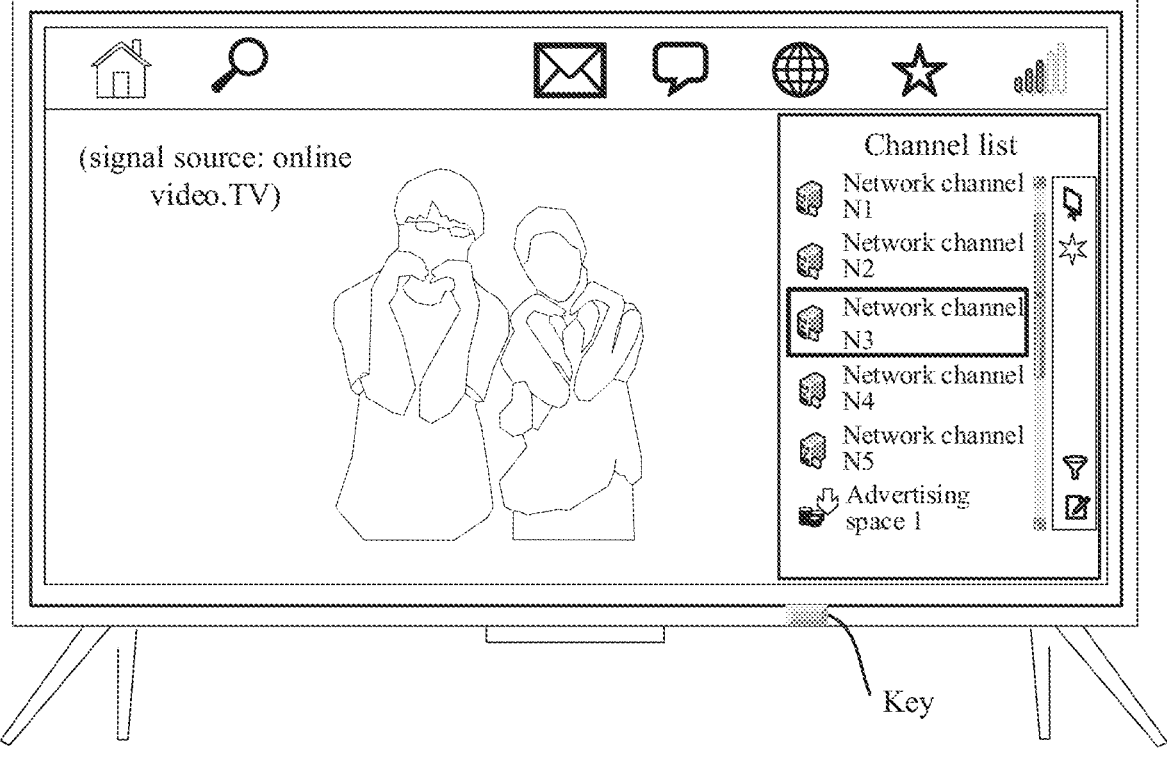
FIG. 13F is a schematic diagram of a user interface of a key menu of a smart television according to some embodiments.

For example, if the first threshold is set as 3 s, the focus is located at the online video.TV virtual channel. If the user presses the key for 3 s or greater, the first controller will start the online video application on the user interface, such that the user interface directly plays the network channel, which may achieve a playing effect of switching from a physical channel to a virtual channel. Moreover, the first menu is controlled to cancel display on the user interface, which is as shown in FIG. 13F.

The channel list of the playing user interface of the smart television in the online video. TV virtual channel includes a plurality of network channels, and may further include advertising spaces from network channel content service providers.

It may be found that, in the above embodiment, a user may achieve a first menu display virtual channels of the smart television only by means of the key, and may switch and play virtual channels by simply causing the key have multiple functions.

In some embodiments, when the key menu, that is, the first menu, is in a display state, the first controller of the smart television receives an operation like pressing the key, that is, it will detect and identify an operation intention of a user.

After the user presses the key, the first controller sets a timer in a system, for example, the timer may be set for 3 s for confirmation. After the timer is set, the first controller monitors whether an operation of releasing the key is received.

If the operation of releasing the key is received before timing of the timer ends, the first controller clears timing of 3 s for confirmation of the timer, and controls the focus to move down in the first menu on the user interface row by row, so as to move the cursor on the user interface as the key is pressed.

Figure 16:
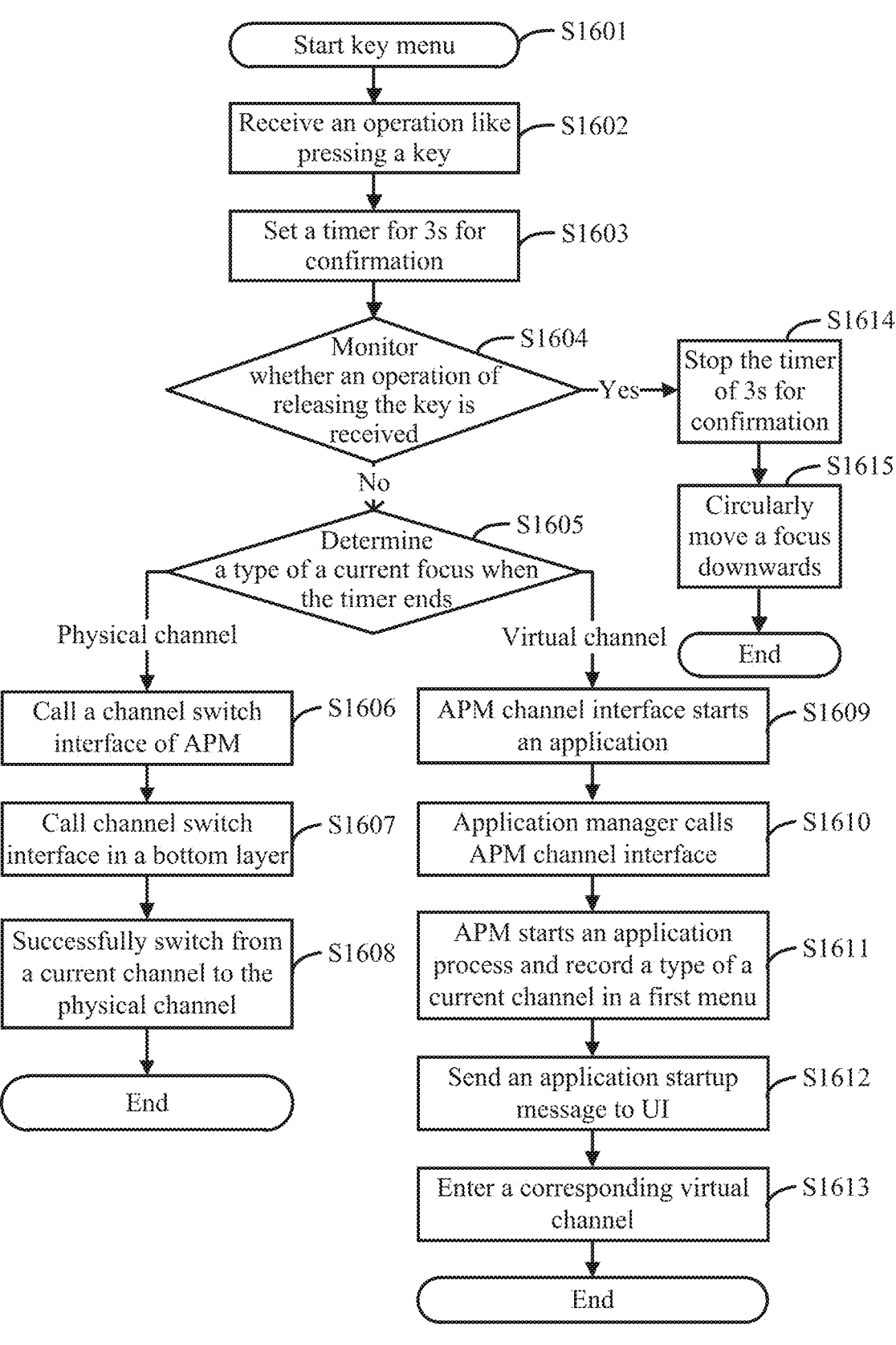
FIG. 16 is a schematic diagram of change logic of a physical channel and a virtual channel of a smart television according to some embodiments.

If the operation of releasing the key is not received before the timer ends, the first controller determines an operation of a user on the key as a confirmation operation, and the first controller will determine a type of an option where a current focus is located. If the current focus is located in a physical channel, the first controller will call a channel switch interface of Application Manager (APM) to switch channel, and enter a corresponding physical channel by calling a channel switch interface in a bottom layer, so as to successfully switch from a current channel to the physical channel. If the current focus is located in a virtual channel, the first controller will use APM control mode, causing the APM channel interface to start an application, and recording a type of a current channel in a first menu. After a corresponding application is started, an application startup message is sent to a UI, and the user interface displays the corresponding application being started, so as to play a corresponding virtual channel thereof, thereby switching to the virtual channel, which is as shown in FIG. 16.

S1601, Start key menu.

S1602, Receive an operation like pressing a key.

S1603, Set a timer for 3 s for confirmation.

S1604, Monitor whether an operation of releasing the key is received.

S1605, If the operation is not received, determine a type of a current focus when the timer ends.

S1606, If the channel is a physical channel, call a channel switch interface of APM.

S1607, Call channel switch interface in a bottom layer.

S1608, Successfully switch from a current channel to the physical channel.

S1609, If the channel is a virtual channel, APM channel interface starts an application.

S1610, Application manager calls APM channel interface.

S1611, APM starts an application process and record a type of a current channel in a first menu.

S1612, Send an application startup message to UI.

S1613, Enter a corresponding virtual channel.

S1614, If the operation is received, stop the timer of 3 s for confirmation.

S1615, Circularly move a focus downwards.

The present disclosure further provides a display and channel switch method in a display apparatus. The method includes: when a first command for starting a first menu from a user is received, send a second command for obtaining a first virtual channel to a server, the second command is used for enabling the server to determine the first virtual channel that may be displayed in parallel with a first physical channel according to a device identifier in the second command, and the first virtual channel corresponding to a first application which supports playing a network channel; and receive a third command including the first virtual channel sent from the server, and display a first menu including the first virtual channel, the first virtual channel is used for starting the first application after receiving a confirmation operation of the user, so as to play the network channel.

According to an embodiment of the present disclosure, by using the second command, a virtual channel corresponding to an application supporting a live broadcast of a network channel is locally obtained on a smart television. Further, by using the first menu comprising the first virtual channel, the virtual channel and the physical channel are displayed in parallel. Moreover, by presenting and controlling the first menu by making the key multi-functioning, virtual channels may be operated by means of the key, operations of switching the virtual channels may be reduced, convenience of switching the virtual channels is improved, and the virtual channels may be switched and controlled by means of the key without a remote control.

In some embodiments, after the display apparatus is started, a display interface of a signal source selected previous time or a signal source selection interface may be directly shown, the signal source may be a preset video-on-demand program, and may also be at least one of an HDMI interface, a live television interface, etc., and after a user selects different signal sources, a display may display contents obtained from different signal sources.

The display apparatus may provide functions of playing audio and video data for users. For example, the display apparatus may search channels by means of a set-top box, and after a channel search is completed, the display apparatus may play programs corresponding to each channel. The user may control the display apparatus to play the programs from different channels by channel switching.

In a channel switch process, every time a user switches to a channel, the display apparatus decodes video data corresponding to the corresponding channel. Generally, each channel corresponds to at least one channel number, and when a user switches two channels between two discontinuous channel numbers, it is necessary to switch channels for many times. In this process, the display apparatus is required to decode video data for many times, such that a data processing load of the display apparatus is large.

In view of the above issues, the embodiments further provide a display apparatus. The display apparatus at least includes: a controller and a display.

FIG. 17 is a flow diagram of interaction between a display apparatus and a user according to some embodiments. In some embodiments, the display apparatus at least includes a display and a controller.

In some embodiments, the display includes a first region and a second region.

In some embodiments, the first region is used for presenting a program, and the second region is used for presenting channel information.

The program in the present disclosure is a live broadcasting program, and signal sources of the programs may include a satellite signal received via a set-top box, or may be a network signal transmitted by means of a network. Each program corresponds to a channel.

In some embodiments, the channel information is information for describing a program displayed on a channel or some attributes of the channel. For example, the channel information may include channel attributes such as a channel name and a channel number, the channel number is not the only attribute of a channel, and the channel number can vary depending on the channel searched in a channel search process of the display apparatus. The channel information may further include program information of the program played on the channel, the program information includes a program name of the program that is being played, a program playing progress and program names of programs to be played on the channel in a period of time in the future.

Figure 18:
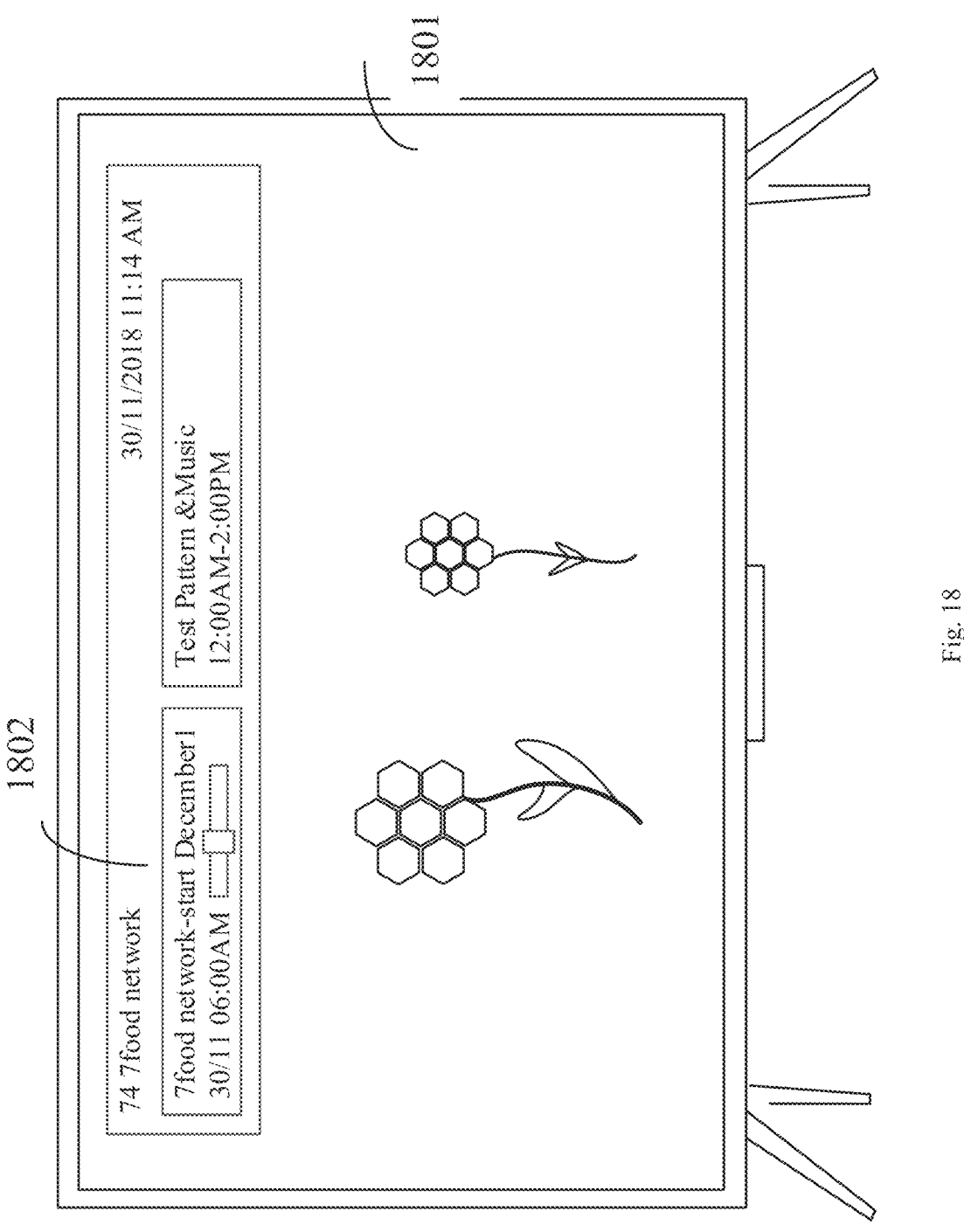
FIG. 18 is a schematic diagram of a display apparatus according to some embodiments.

FIG. 18 is a schematic diagram of a display apparatus according to some embodiments. A content displayed by the display includes a first region 1801 and a second region 1802. The first region 1801 is used for presenting a program currently being played, and the second region 1802 is used for presenting channel information. In the embodiment, the channel information may include a program name of the program currently played, a playing progress of the program, a channel number, and program names of programs to be played on the channel in a period of time in the future.

In some embodiments, as shown in FIG. 17, the controller is configured to call channel information (S1701).

In some embodiments, the channel information may be called through a variety of methods. For example, a user may call the channel information by touching a key on a remote control. For example, the user may call the channel information by means of user voice. In some embodiments, if the second region does not display channel information, in response to an operation of calling channel information from a user, the controller is configured to control the second region to display first channel information (S1702).

In some embodiments, the first channel information is channel information corresponding to a channel received by the display apparatus before the user calls the channel information. With reference to FIG. 18, a channel number of a channel where the first region 1801 in FIG. 18 is located is 74.

In some embodiments, the first channel information includes: first program information and second program information. The first program information is program information of a first program, the first program is a program displayed in the first region, the second program information is program information of a second program, and the second program is a program played by the first channel after the first program is played.

Figure 19:
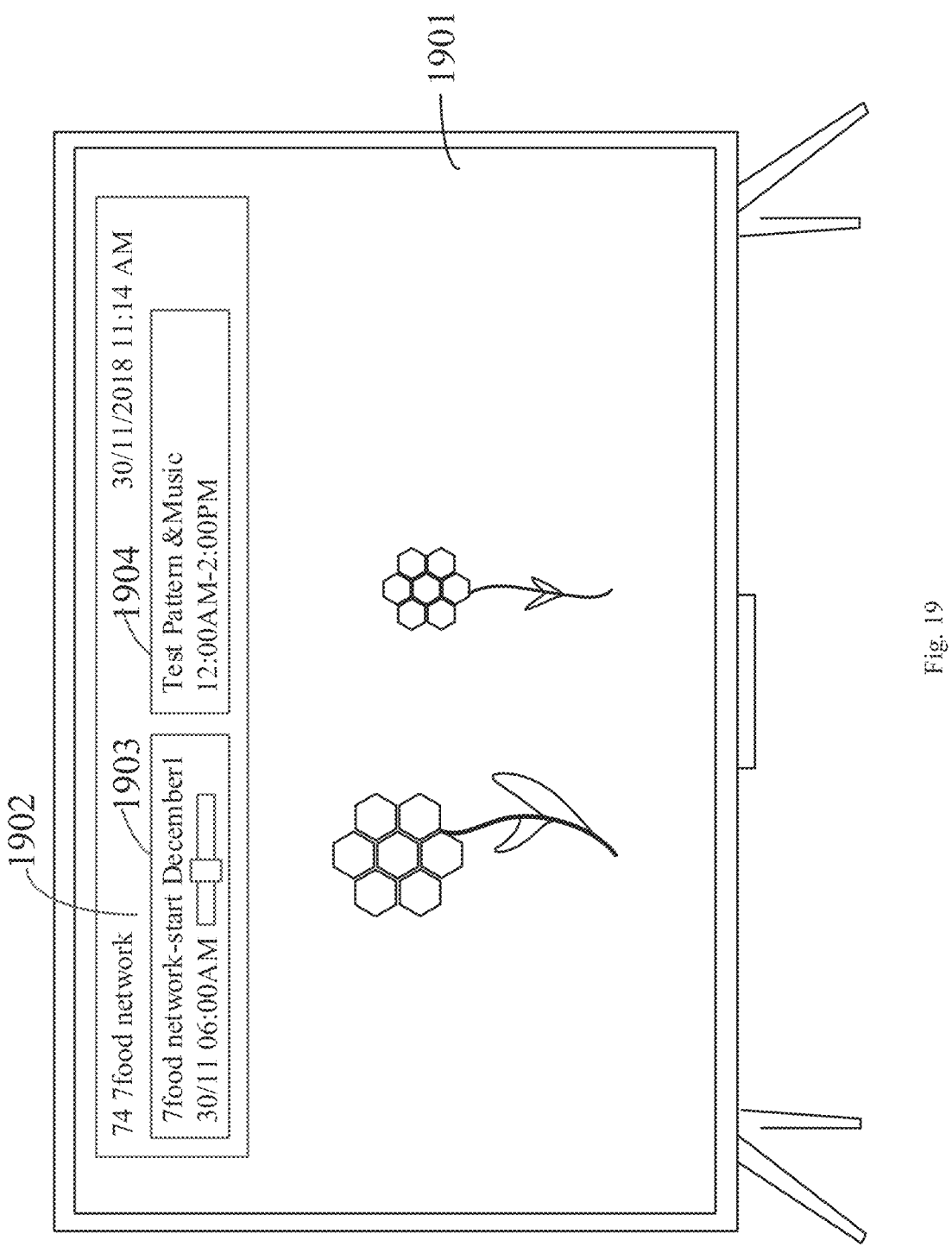
FIG. 19 is a schematic diagram of a display apparatus according to some embodiments.

The first program, the second program, the first program information and the second program information will be described below with reference to the accompanying drawings. FIG. 19 is a schematic diagram of a display apparatus. It can be seen that a display of the display apparatus presents a first region 1901 and a second region 1902, a program displayed in the first region 1901 being a first program. The program information displayed in the second region 1902 includes first program information 1903 and second program information 1904, the first program information being related to the first program. In the embodiment, the first program information includes a program name of the first program. The second program information 74 is a program name of a program to be played between 12:00~2:00 AM.

In order to help a user better understand a playing progress of a program currently played (also referred to as a first program in the embodiment), the first program information includes a progress bar of the first program. The user may know the playing progress of the program currently played by means of the progress bar.

In some embodiments, in response to an operation for channel switching from a user, the controller is configured to control the second region to update channel information (S1703).

In some embodiments, there are various methods for channel switching. For example, a user may by touching an "up" or "down" key on the remote control, the user may switch a channel by means of voice, etc.

Figure 20:
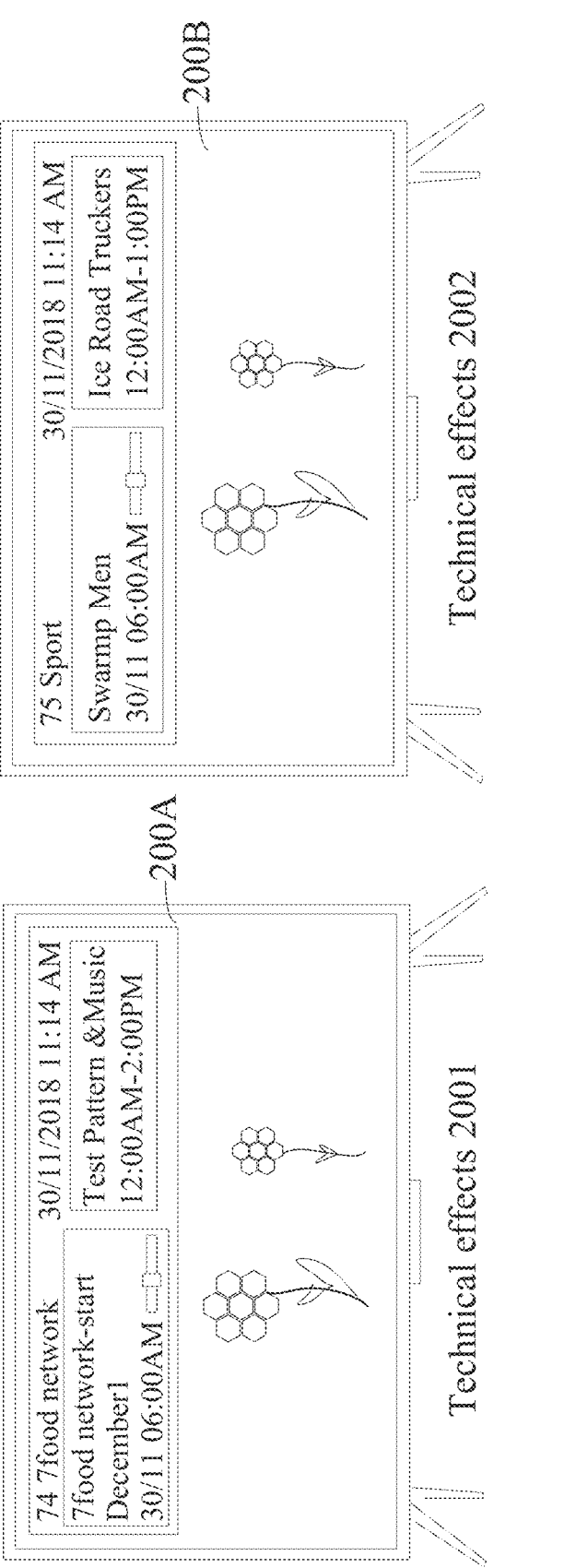
FIG. 20 is a diagram of changes of a display apparatus before and after a call of channel information when first channel information is displayed in a second region according to some embodiments.

Contents presented on the display are described below with reference to the accompanying drawings. FIG. 20 is a diagram of changes of a display interface of a display apparatus before and after a call of channel information when first channel information is displayed in a second region according to some embodiments. With reference to FIG. 20, in an initial state, a first region 200A displays a program displayed on a channel 74, and a second region 200B displays channel information of a channel 75, details of which may be obtained with reference to an effect 2001 in FIG. 20. In the embodiment, a user touches a "down" key on a remote control, and correspondingly the remote control outputs a channel information calling command. In response to the channel information calling command, a controller calls the channel information of the channel 75 and controls the second region 200B to display the channel information of the channel details of which may be obtained with reference to an effect 2002 in FIG. 20, and in this case, the controller does not receive audio and video data of the channel 75.

In some embodiments, in response to a confirmation operation from the user, the controller is configured to decode audio and video data of a target channel to obtain a second program (S1704). The target channel is a channel corresponding to channel information after channel switching.

In some embodiments, the controller is configured to control a content displayed in the first region from a first program to the second program (S1705). The first program is a program displayed in the first region before channel switching.

According to the display apparatus in the embodiment, when a user wants to perform channel switching, channel information update without implementing channel audio and video data decoding will present for the user instead of actually decoding audio and video data for a temporary channel during channel switching process, when the user lands on a desirable channel, the user may switch from an original signal to this program signal (also called audio and video data in an embodiment of the present disclosure) via a confirmation operation, so as to switch to the program signal of the desirable channel. It can be seen that the display apparatus in the embodiment may reduce a process for decoding audio and video data, thereby reducing a data processing amount of the display apparatus.

According to the display apparatus in the embodiment, a frequent audio and video data decoding switch is replaced with data and channel information update on the display.

An embodiment of the present disclosure further provides a method for rendering a second region. With reference to FIG. 21, the second region includes N display columns, N is a positive integer. The controller is further configured to execute S2101-S2104.

S2101: obtain first program information and second program information in response to an operation for calling channel information from a user.

S2102: arrange the first program information and the second program information according to a sequence of playing time.

In the embodiment, each piece of program information (including the first program information and the second program information) corresponds to one piece of playing time. The controller may arrange the program information according to playing time.

S2103: in response to the operation of calling channel information from a user, render previous N pieces of program information by taking the first program information as a start point.

S2104: control a display column to display a piece of rendered program information.

In the embodiment, the controller uses a cascading style sheets (CSS) animation effect to achieve a list moving effect by creating a virtual list structure, the list structure is used for recording program information. A virtual list display technology may render ten thousand pieces of data or more, and N pieces of data (N is far less than the number of program information) are rendered each time of rendering, such that no additional rendering burden is brought to the display apparatus.

In some embodiments, the controller is further configured to execute S2105-S2106.

S2105: in response to the operation of calling channel information, render previous N pieces of program information by taking a piece of program information after change as a start point.

S2106: control a display column to display a piece of rendered program information.

FIG. 22 is a schematic diagram of a second region according to some embodiments. It can be seen that the second region includes four display columns, and in an initial state, a display effect of the second region may be obtained with reference to an effect 2201, and the second region displays program information 1, program information 2, program information 3 and program information 4. In response to an operation for changing information, program information after switch is the program information 2, and in this case, the controller only renders the program information 2, the program information 3, the program information 4, and the program information 5. In this case, a display effect of the second region may be obtained with reference to an effect 2202.

An embodiment of the present disclosure further provides a change method for channel information. With reference to FIG. 23, the display apparatus further includes a remote control, the remote control is configured with a key for channel switching, and in response to a selection of the key, the second region updates presentation of channel information, and the controller is further configured to execute 2301-2302.

S2301: in response to pressing of the key for channel switching, track press time of the key to obtain a pressing time.

The key for channel switching may be any key on the remote control, for example, a channel up or channel down key or directional keys.

In some embodiments, the pressing time takes time when a user starts to press the change key as a start point, and takes time when the user stops pressing or releases the key as an end point.

S2302: control, according to the pressing time, a second region to update presentation of channel information.

In some embodiments, the display apparatus may receive twenty channel switches, and the second region skips one piece of channel information each time the pressing time is increased by 0.2 s. For example, the second region currently displays channel information of a channel 1, and when pressing time for a user to press the key is (0.2*20), the second region displays channel information of a channel 20. In the embodiment, an end of a program may be quickly achieved only by long pressing the key once, and a confirmation key of the remote control is pressed to realize channel switching.

An embodiment of the present disclosure further provides a channel change method. With reference to FIG. 24, the display apparatus further includes a remote control, the remote control is configured with a key for channel switching, and in response to pressing the key for channel switching, the second region updates presentation of channel information, and the controller is further configured to execute S2401-S2402.

S2401: in response to pressing a key for channel switching, record press time of the key to obtain a pressing time.

S2402: in response to the pressing time being greater than or equal to preset time, cause the second region to update presentation of channel information.

The preset time is not limited in the embodiment. For example, the preset time may be 0.2 s. If a user presses the key for 0.2 s or above, the second region will update presentation of channel information. For example, the second region currently displays the channel information of the channel 1, if the user presses the key for 0.2 s, the second region displays channel information of a channel 2, if the user presses the key for 0.4 s (0.2 s for the second time), the second region displays channel information of a channel 3, and so on, until the user releases pressing of the key.

The present disclosure further provides a non-volatile computer-readable storage medium, the storage medium may store instructions, and the instruction can be run on a processor to perform some or all of the steps of the above embodiments in the present disclosure. The storage medium may be a magnetic disk, an optical disk, a read-only memory (ROM), a random access memory (RAM), etc.

For ease of explanation, the foregoing description is provided in combination with specific implementations. However, the above exemplary discussions are not intended to be exhaustive or to limit the implementations to the specific forms disclosed above. Many modifications and variations may be obtained according to the above teaching. The above implementations are chosen and described in order to better explain principles and practical applications, so as to enable those skilled in the art to better use the implementations and various different modifications suitable for specific use.

What is claimed is:

1. A display apparatus, comprising:
a display, configured to present a video and/or a user interface, wherein the user interface comprises a picture mode settings menu, the picture mode settings menu comprises at least one picture quality setting option, and one of the at least one picture quality setting option comprises a parameter;

a memory, configured to store instructions and data associated with the display;

at least one processor, in connection with the display and the memory, and configured to execute the instructions to cause the display apparatus to:

in response to an operation from a user, set an identifier for a frame on each of switch nodes in the video, wherein the identifier comprises a first identifier for identifying the frame as a switch node and a second identifier for identifying a target content type;

when an ith frame of the video is played, continuously detect whether (i+1)th to (i+M)th frames have the identifiers, wherein i is an integer greater than or equal to 1, and M is an integer greater than or equal to 2;

setting frames to be displayed corresponding to detected identifiers as a plurality of target frames;

in response to that the identifiers are detected, obtain the first picture quality parameter information matching the target content types corresponding to the plurality of target frames from preset data of the display apparatus, wherein the first picture quality parameter information comprises a parameter of the at least one picture quality setting option corresponding to the target content type;

based on the obtained first picture quality parameter information, determining a plurality of picture mode settings that will change along with changes of the target content type;

pre-filtering picture quality setting options in picture mode settings menus for the plurality of target frames having the identifiers in the (i+1)th to (i+M)th frames to be displayed by filtering out the plurality of picture mode settings that will change; wherein; and control the display to update the picture mode settings menu according to the first picture quality parameter information.

2. The display apparatus according to claim 1, wherein the at least one processor is further configured to execute the instructions to cause the display apparatus to:

in response to no first picture quality parameter information matching the target content type being obtained from the preset data, obtain a second picture quality parameter information from the preset data, wherein the second picture quality parameter information comprises a parameter of the at least one picture quality setting option corresponding to a default content type; and control the display to update the picture mode settings menu according to the second picture quality parameter information.

3. The display apparatus according to claim 1, wherein the at least one processor is further configured to execute the instructions to cause the display apparatus to:

monitor a playing process of the video in real time; and when a switch node indicated by a video configuration file is reached in the playing process, obtain a target content type corresponding to the switch node.

4. The display apparatus according to claim 1, wherein the preset data further comprises a plurality of reserved data bits, and the at least one processor is further configured to execute the instructions to cause the display apparatus to:

define a newly added content type, and configure corresponding picture quality parameter information for the newly added content type; and store a corresponding relation between the newly added content type and the corresponding picture quality parameter information in the plurality of reserved data bits.

5. The display apparatus according to claim 3, wherein the at least one processor is further configured to execute the instructions to cause the display apparatus to:

configure the video configuration file for each video, wherein the video configuration file comprises a corresponding relation between switch nodes marked on a playing timeline and target content types.

6. The display apparatus according to claim 1, wherein the preset data comprises a predefined corresponding relation between the target content type and picture quality parameter information.

7. The display apparatus according to claim 6, wherein the target content type in the preset data comprise a defined content type and a reserved to-be-defined content type.

8. The display apparatus according to claim 1, wherein the at least one processor is further configured to execute the instructions to cause the display apparatus to:

pre-filter the picture quality setting options that change along with changes of the target content type by filtering out picture quality setting options with default parameters or with parameters that are adaptively adjusted to obtain a set of options, wherein the set of options comprises at least one of sharpness, noise reduction, or MPEG; and construct parameters of the picture quality setting options by configuring optimal parameters for the picture quality setting options included in the set of options respectively for different content types.

9. The display apparatus according to claim 1, wherein the at least one processor is further configured to execute the instructions to cause the display apparatus to:

when the video starts to be played, present the picture mode settings menu after the user inputs a command for invoking the picture mode settings menu.

10. A refreshing method for a display apparatus, comprising:

in response to an operation from a user, setting an identifier for a frame on each of switch nodes in a video, wherein the identifier comprises a first identifier for identifying the frame as a switch node and a second identifier for identifying a target content type;

when an ith frame of the video is played, continuously detecting whether (i+1)th to (i+M)th frames have the identifiers, wherein i is an integer greater than or equal to 1, and M is an integer greater than or equal to 2;

setting frames to be displayed corresponding to detected identifiers as a plurality of target frames;

in response to that the identifiers are detected, obtaining first picture quality parameter information matching the target content types corresponding to the plurality of target frames from preset data of the display apparatus, wherein the first picture quality parameter information comprises a parameter of the at least one picture quality setting option corresponding to the target content type;

based on the obtained first picture quality parameter information, determining a plurality of picture mode settings that will change along with changes of the target content type;

pre-filtering picture quality setting options in picture mode settings menus for the plurality of target frames having the identifiers in the (i+1)th to (i+M)th frames to be displayed by filtering out the plurality of picture mode settings that will change; wherein; and updating the picture mode settings menu according to the first picture quality parameter information.

11. The method according to claim 10, further comprising:

in response to no first picture quality parameter information matching the target content type being obtained from the preset data, obtaining a second picture quality parameter information from the preset data, wherein the second picture quality parameter information comprises a parameter of the at least one picture quality setting option corresponding to a default content type; and updating the picture mode settings menu according to the second picture quality parameter information.

12. The method according to claim 10, further comprising:

monitoring a playing process of the video in real time; and when a switch node indicated by a video configuration file is reached in the playing process, obtaining a target content type corresponding to the switch node.

13. The method according to claim 10, wherein the preset data further comprises a plurality of reserved data bits, and the method further comprises:

defining a newly added content type, and configuring corresponding picture quality parameter information for the newly added content type; and storing a corresponding relation between the newly added content type and the corresponding picture quality parameter information in the plurality of reserved data bits.

14. The method according to claim 12, further comprising:

configuring the video configuration file for each video, wherein the video configuration file comprises a corresponding relation between switch nodes marked on a playing timeline and target content types.

15. The method according to claim 10, wherein the preset data comprises a predefined corresponding relation between the target content type and picture quality parameter information.

16. The method according to claim 15, wherein the target content type in the preset data comprise a defined content type and a reserved to-be-defined content type.

17. The method according to claim 10, further comprising:

wherein the pre-filtering the picture quality setting options that will change along with changes of the target content type includes filtering out picture quality setting options with default parameters or with parameters that are adaptively adjusted to obtain a set of options, wherein the set of options comprises at least one of sharpness, noise reduction, or MPEG; and constructing parameters of the picture quality setting options by configuring optimal parameters for the picture quality setting options included in the set of options respectively for different content types.

18. The method according to claim 10, further comprising:

when the video starts to be played, presenting the picture mode settings menu after the user inputs a command for invoking the picture mode settings menu.

\* \* \* \* \*